US012586161B2

(12) United States Patent
Cao et al.

(10) Patent No.: US 12,586,161 B2
(45) Date of Patent: Mar. 24, 2026

(54) SYSTEMS AND METHODS FOR OPTIMIZED ITERATIVE IMAGE RECONSTRUCTION

(71) Applicant: SHANGHAI UNITED IMAGING HEALTHCARE CO., LTD., Shanghai (CN)

(72) Inventors: Wenjing Cao, Shanghai (CN); Haohua Sun, Shanghai (CN); Liyi Zhao, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 615 days.

(21) Appl. No.: 18/056,778

(22) Filed: Nov. 18, 2022

(65) Prior Publication Data

US 2023/0085203 A1 Mar. 16, 2023

Related U.S. Application Data

(63) Continuation of application No. PCT/CN2021/094464, filed on May 18, 2021.

(30) Foreign Application Priority Data

May 18, 2020 (WO) ................ PCT/CN2020/090861

(51) Int. Cl.
*G06T 5/70* (2024.01)
*G06T 11/00* (2006.01)

(52) U.S. Cl.
CPC .............. *G06T 5/70* (2024.01); *G06T 11/005* (2013.01); *G06T 11/006* (2013.01);
(Continued)

(58) Field of Classification Search
CPC .......................................... G06T 2207/20081
See application file for complete search history.

(56) References Cited

U.S. PATENT DOCUMENTS

| 6,507,633 B1 | 1/2003 | Elbakri et al. |
| 9,478,048 B2 | 10/2016 | Royalty et al. |

(Continued)

FOREIGN PATENT DOCUMENTS

| CN | 109461192 A | 3/2019 |
| CN | 109523602 A | 3/2019 |

(Continued)

OTHER PUBLICATIONS

Cheng et al., Accelerated Iterative Image Reconstruction Using a Deep Learning Based Leapfrogging Strategy, Jun. 2017, Conference: International Conference on Fully Three-Dimensional Image Reconstruction in Radiology and Nuclear Medicine, pp. 1-19, AAPA furnished via IDS.*

(Continued)

*Primary Examiner* — Guillermo M Rivera-Martinez
(74) *Attorney, Agent, or Firm* — METIS IP LLC

(57) ABSTRACT

The present disclosure relates to systems and methods for image reconstruction. The systems and methods may obtain an initial image to be processed. The systems and methods may also generate a reconstructed image by performing a plurality of iteration steps on the initial image. At least one of the plurality of iteration steps may include a first optimization operation and a second optimization operation. The first optimization operation may include receiving an image to be processed in the iteration step and determining an updated image by preliminarily optimizing the image to be processed. The second optimization operation may include determining, using an optimizing model, an optimized image based on the updated image and designating the optimized image as a next image to be processed in a next iteration step or designating the optimized image as the reconstructed image.

20 Claims, 11 Drawing Sheets

700

(52) U.S. Cl.
CPC ....... *G06T 11/008* (2013.01); *G06T 2211/424* (2013.01); *G06T 2211/436* (2013.01)

(56) References Cited

U.S. PATENT DOCUMENTS

| | | | | |
|---|---|---|---|---|
| 10,679,385 | B1 | 6/2020 | Yanoff et al. | |
| 11,328,391 | B2 | 5/2022 | Li et al. | |
| 2007/0140408 | A1* | 6/2007 | Takiura | A61B 6/032 |
| | | | | 378/4 |
| 2011/0262054 | A1* | 10/2011 | Benson | G06T 11/006 |
| | | | | 382/275 |
| 2011/0293158 | A1* | 12/2011 | Popescu | G06T 11/006 |
| | | | | 382/266 |
| 2012/0207370 | A1 | 8/2012 | Fahimian et al. | |
| 2012/0263360 | A1 | 10/2012 | Zhu et al. | |
| 2013/0002659 | A1* | 1/2013 | Jiang | G06T 11/006 |
| | | | | 345/419 |
| 2013/0101190 | A1 | 4/2013 | Shi et al. | |
| 2013/0336561 | A1* | 12/2013 | Zamyatin | G06T 11/006 |
| | | | | 382/131 |
| 2013/0336562 | A1 | 12/2013 | Zamyatin et al. | |
| 2014/0363067 | A1 | 12/2014 | Stayman et al. | |
| 2015/0170341 | A1 | 6/2015 | Fan et al. | |
| 2015/0221124 | A1 | 8/2015 | Noo et al. | |
| 2016/0071245 | A1 | 3/2016 | Bergner et al. | |
| 2017/0039706 | A1 | 2/2017 | Mikhno et al. | |
| 2017/0294034 | A1* | 10/2017 | Zhou | G06T 11/008 |
| 2017/0303868 | A1* | 10/2017 | Lee | G06T 11/006 |
| 2017/0311918 | A1 | 11/2017 | Qi et al. | |
| 2017/0330355 | A1* | 11/2017 | Finkel | G06T 11/005 |
| 2018/0005414 | A1* | 1/2018 | Lee | G06T 11/003 |
| 2018/0038969 | A1 | 2/2018 | Mccollough et al. | |
| 2018/0182133 | A1 | 6/2018 | Tanaka | |
| 2018/0197317 | A1 | 7/2018 | Cheng et al. | |
| 2018/0204305 | A1* | 7/2018 | Wang | G06T 5/70 |
| 2018/0247434 | A1 | 8/2018 | Qin | |
| 2018/0336709 | A1* | 11/2018 | Persson | G06T 11/006 |
| 2019/0236763 | A1 | 8/2019 | Chan et al. | |
| 2019/0251713 | A1 | 8/2019 | Chen et al. | |
| 2019/0325619 | A1* | 10/2019 | Zhang | G06T 11/008 |
| 2019/0365341 | A1* | 12/2019 | Chan | G06N 3/08 |
| 2020/0027251 | A1 | 1/2020 | Demesmaeker et al. | |
| 2020/0043204 | A1 | 2/2020 | Fu et al. | |
| 2020/0090382 | A1 | 3/2020 | Huang et al. | |
| 2020/0242783 | A1 | 7/2020 | Lauritsch et al. | |
| 2020/0279411 | A1* | 9/2020 | Atria | G06T 11/006 |
| 2020/0311878 | A1 | 10/2020 | Matsuura et al. | |
| 2021/0035339 | A1 | 2/2021 | Ahn et al. | |
| 2021/0290194 | A1 | 9/2021 | Bai et al. | |
| 2021/0319600 | A1 | 10/2021 | Tao et al. | |
| 2021/0366168 | A1 | 11/2021 | Hu et al. | |
| 2023/0063828 | A1 | 3/2023 | Bao et al. | |
| 2023/0085203 | A1 | 3/2023 | Cao et al. | |
| 2023/0154066 | A1 | 5/2023 | Cao | |
| 2023/0177746 | A1* | 6/2023 | Shao | G16H 50/20 |
| | | | | 382/131 |

FOREIGN PATENT DOCUMENTS

| | | |
|---|---|---|
| CN | 109712213 A | 5/2019 |
| CN | 110151210 A | 8/2019 |
| CN | 110853742 A | 2/2020 |
| CN | 111127575 A | 5/2020 |
| WO | WO-2018210648 A1 * | 11/2018 |
| WO | 2021232195 A1 | 11/2021 |

OTHER PUBLICATIONS

Tirer et al., Image Restoration by Iterative Denoising and Backward Projections, in IEEE Transactions on Image Processing, vol. 28 , No. 3, pp. 1220-1234, Mar. 2019, doi: 10.1109/TIP.2018.287556.*

International Search Report in PCT/CN2021/094464 mailed on Jul. 27, 2021, 5 pages.

Written Opinion in PCT/CN2021/094464 mailed on Jul. 27, 2021, 5 pages.

First Office Action in Chinese Application No. 202080003406.9 mailed on Nov. 3, 2022, 24 pages.

Niu, Tianye et al., Iterative Image-domain Decomposition for Dual-energy CT, Med. Phys., 41(4): 1-10, 2014.

Dong, Xue et al., Combined Iterative Reconstruction and Image-domain Decomposition for Dual Energy CT Using Total-variation Regularization, Med. Phys., 41(5): 1-9, 2014.

Darin P Clark et al., Spectral Diffusion: an Algorithm for Robust Material Decomposition of Spectral CT Data, Phys. Med. Biol., 59: 6445-6466, 2014.

The Extended European Search Report in European Application No. 20936827.3 mailed on May 9, 2023, 8 pages.

Lishui Cheng et al., Accelerated Iterative Image Reconstruction Using a Deep Learning Based Leapfrogging Strategy, The 14th International Meeting on Fully Three-Dimensional Image Reconstruction in Radiology and Nuclear Medicine, 2017, 6 pages.

The Extended European Search Report in European Application No. 21809428.2 mailed on Aug. 28, 2023, 8 pages.

First Office Action in Chinese Application No. 202180035722.9 mailed on May 31, 2025, 19 pages.

Communication pursuant to Article 94(3) EPC in European Application No. 21809428.2 mailed on Jun. 6, 2025, 5 pages.

Sangtae Ahn et al., Globally Convergent Image Reconstruction for Emission Tomography Using Relaxed Ordered Subsets Algorithms, IEEE Transactions on Medical Imaging, 22(5): 613-626, 2003.

\* cited by examiner

100

200

210
Processor

220
Storage

230
I/O

240
Communication port

300

320
Display

310
Communication Platform

360
OS   370

330
GPU

380
App(s)

340
CPU

Memory

350
I/O

390
Storage

<u>500</u>

600

700

800

900

1210-1

1210-2

1220-1

1220-2

1310

1320

1400

SYSTEMS AND METHODS FOR OPTIMIZED ITERATIVE IMAGE RECONSTRUCTION

CROSS-REFERENCE TO RELATED APPLICATIONS

This application is a Continuation of International Application No. PCT/CN2021/094464, filed on May 18, 2021, which claims priority of International Application No. PCT/CN2020/090861, filed on May 18, 2020, the contents of which are hereby incorporated by reference.

TECHNICAL FIELD

The present disclosure generally relates to image reconstruction, and more particularly, relates to systems and methods for iterative image reconstruction.

BACKGROUND

Medical imaging, such as computed tomography (CT) is widely used in disease diagnosis and/or treatment for various medical conditions (e.g., tumors, coronary heart diseases, or brain diseases). Image reconstruction is a key technology used in the field of medical imaging. Take CT image as an example, conventionally, a CT image can be reconstructed based on traditional filtered back projection (FBP) or FBP-based iteration. However, during the reconstruction of the CT image, a reduced dose or insufficient data may significantly effect a quality of the reconstructed CT image. In addition, the CT image can be iteratively reconstructed by optimizing a loss function including a regularization term such as a total variation, a Generalized Gaussian Markov Random Field (GGMRF). According to the iterative reconstruction process, although noises in the reconstructed CT image can be suppressed, the regularization term may result in relatively low image quality (e.g., massive artifacts, cartoon sense). Therefore, it is desirable to provide systems and methods for image reconstruction with improved image quality, thereby improving the efficiency and accuracy of medical analysis and/or diagnosis.

SUMMARY

In an aspect of the present disclosure, a method for image reconstruction is provided. The method may be implemented on a computing device including at least one processor and a computer-readable storage device. The method may include obtaining an initial image to be processed. The method may also include generating a reconstructed image by performing a plurality of iteration steps on the initial image. At least one of the plurality of iteration steps may include a first optimization operation and a second optimization operation. The first optimization operation may include receiving an image to be processed in the iteration step and determining an updated image by preliminarily optimizing the image to be processed. The second optimization operation may include determining, using an optimizing model, an optimized image based on the updated image and designating the optimized image as a next image to be processed in a next iteration step or designating the optimized image as the reconstructed image.

In another aspect of the present disclosure, a system for image reconstruction is provided. The system may include at least one storage device including a set of instructions and at least one processor configured to communicate with the at least one storage device. When executing the set of instructions, the at least one processor is configured to direct the system to perform following operations. The operations may include obtaining an initial image to be processed and generating a reconstructed image by performing a plurality of iteration steps on the initial image. At least one of the plurality of iteration steps may include a first optimization operation and a second optimization operation. The first optimization operation may include receiving an image to be processed in the iteration step and determining an updated image by preliminarily optimizing the image to be processed. The second optimization operation may include determining, using an optimizing model, an optimized image based on the updated image and designating the optimized image as a next image to be processed in a next iteration step or designating the optimized image as the reconstructed image.

In another aspect of the present disclosure, a system for image reconstruction is provided. The system may include an obtaining module and a reconstruction module. The obtaining module may be configured to obtain an initial image to be processed. The reconstruction module may be configured to generate a reconstructed image by performing a plurality of iteration steps on the initial image. At least one of the plurality of iteration steps may include a first optimization operation and a second optimization operation. The first optimization operation may include receiving an image to be processed in the iteration step and determining an updated image by preliminarily optimizing the image to be processed. The second optimization operation may include determining, using an optimizing model, an optimized image based on the updated image and designating the optimized image as a next image to be processed in a next iteration step or designating the optimized image as the reconstructed image.

In another aspect of the present disclosure, a non-transitory computer readable medium is provided. The non-transitory computer readable medium may include executable instructions that, when executed by at least one processor, direct the at least one processor to perform a method. The method may include obtaining an initial image to be processed. The method may also include generating a reconstructed image by performing a plurality of iteration steps on the initial image. At least one of the plurality of iteration steps may include a first optimization operation and a second optimization operation. The first optimization operation may include receiving an image to be processed in the iteration step and determining an updated image by preliminarily optimizing the image to be processed. The second optimization operation may include determining, using an optimizing model, an optimized image based on the updated image and designating the optimized image as a next image to be processed in a next iteration step or designating the optimized image as the reconstructed image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
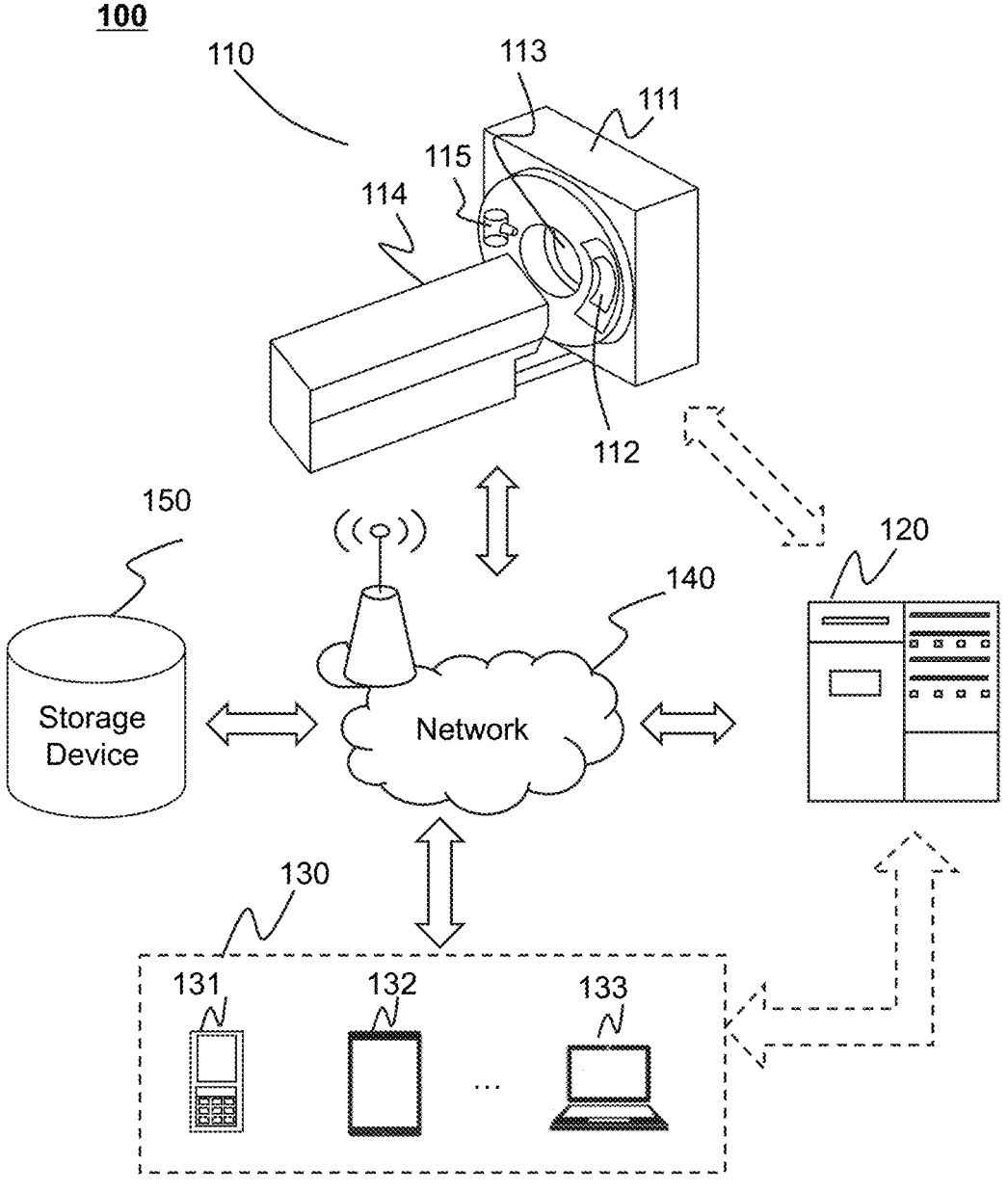
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block," as used herein, refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 illustrated in FIG. 2 and/or the central processing unit (CPU) 340 illustrated FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/subblocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are medical systems and methods for non-invasive biomedical imaging/treatment, such as for disease diagnostic, disease therapy, or research purposes. In some embodiments, the medical system may include a medical imaging system. The medical imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, an ultrasound imaging system, an X-ray imaging system (e.g., a digital radiography (DR) system, a computed radiography (CR) system), a computed tomography (CT) system, a magnetic resonance imaging (MRI) system, an ultrasonography system, a single photon emission computed tomography (SPECT), a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, a digital subtraction angiography (DSA) system, or the like, or any combination thereof. The multi-modality system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, etc. In some embodiments, the medical system may include a treatment system. The treatment system may include a treatment plan system (TPS), an image-guided radiotherapy (IGRT) system, etc. The image-guided radiotherapy (IGRT) may include a treatment device and a medical imaging device. The treatment device may include a linear accelerator, a cyclotron, a synchrotron, etc., configured to perform radiotherapy on a subject. The treatment device may include an accelerator of species of particles including, for example, photons, electrons, protons, or heavy ions. The medical imaging device may include an MRI scanner, a CT scanner (e.g., cone beam computed tomography (CBCT) scanner), a digital radiology (DR) scanner, an electronic portal imaging device (EPID), etc. It should be noted that the medical system described below is merely provided for illustration purposes, and not intended to limit the scope of the present disclosure.

In the present disclosure, the subject may include a biological object and/or a non-biological object. The biological subject may be a human being, an animal, a plant, or a specific portion, organ, and/or tissue thereof. For example, the subject may include a head, a neck, a thorax, a heart, a stomach, a blood vessel, a soft tissue, a tumor, a nodule, or the like, or any combination thereof. In some embodiments, the subject may be a man-made composition of organic and/or inorganic matters that are with or without life. The terms "object" and "subject" are used interchangeably in the present disclosure.

In the present disclosure, a representation of an object (e.g., a patient, a subject, or a portion thereof) in an image may be referred to as an "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

In some embodiments, the term "angle" or "scanning angle" used in the present disclosure refers to a rotation angle that a radiation source of the imaging device rotates with respect to an initial angle of the radiation source and/or a rotation angle that a gantry (on which the radiation source is located) rotates with respect to an initial angle of the gantry. The terms "angle" and "scanning angle" are used interchangeably in the present disclosure.

An aspect of the present disclosure relates to systems and methods for image reconstruction. The systems may obtain an initial image (e.g., a CT image) to be processed and generate a reconstructed image by performing a plurality of iteration steps on the initial image. At least one of the plurality of iteration steps may include a first optimization operation and a second optimization operation. In the first optimization operation in an iteration step, the systems may receive an image to be processed (e.g., the initial image for the first iteration step) in the iteration step and determine an updated image by preliminarily optimizing the image to be processed (e.g., according to a loss function related to a first quality weight associated with a quality of originally acquired projection data, a second quality weight associated with a quality of the image to be processed and/or a third weight associated with a cone angle corresponding to at least one detector row that acquires the originally acquired projection data. In the second optimization operation in the iteration step, the systems may determine an optimized image by optimizing the updated image and designate the optimized image as a next image to be processed in a next iteration step or designate the optimized image as the reconstructed image. The systems may determine the optimized image by reducing the interference information of the updated image based on a machine learning model (e.g., a deep learning model).

According to the systems and methods of the present disclosure, a reconstructed image is generated by performing a plurality of iteration steps each of which includes a first optimization operation (which is used to preliminarily optimize the image to be processed) and a second optimization operation (which is used to further optimize an updated image generated in the first operation) implemented via a optimizing model (e.g., a machine learning model), that is, a preliminary optimization and a further optimization via a machine learning model are used in combination, which can improve the image quality of the reconstructed image and optimize the reconstructed image (e.g., reduce the noise of the reconstructed image).

In some embodiments, for cardiac imaging scenarios, the heart may be scanned in a preset scanning angle range for acquiring multiple sets of scanning data. Each of the multiple sets of scanning data may correspond to one of multiple cardiac image slices of a cardiac image. Each cardiac image slice may be generated based on a set of scanning data acquired by detector row(s) that correspond to a cone angle (see, e.g., a cone angle 1141 or 1142 in FIG. 11). The amounts of scanning data acquired by detector rows of different cone angles may be different. Different limited angle range may be assigned for reconstructing cardiac image slices corresponding to different cone angles. For instance, for a cardiac image slice of a large cone angle, a large limited angle range may be assigned to compensate the amount of image data acquired by detector row(s) corresponding to the large cone angle, while for a cardiac image slice of a small cone angle, a small limited angle range may be assigned to achieve a high time resolution. In addition, the cardiac image slices may be processed by the first optimization operation which takes corresponding cone angles into consideration (e.g., according to formula (7) in FIG. 6), thereby further improving the quality of the reconstructed image.

FIG. 1 is a schematic diagram illustrating an exemplary medical system according to some embodiments of the present disclosure. As illustrated, the medical system 100 may include a scanning device 110, a processing device 120, a terminal device 130, a network 140, and a storage device 150. The components of the medical system 100 may be connected in one or more of various ways. Mere by way of example, as illustrated in FIG. 1, the scanning device (also referred to as a medical imaging device) 110 may be connected to the processing device 120 through the network 140. As another example, the scanning device 110 may be connected to the processing device 120 directly (as indicated by the bi-directional arrow in dotted lines linking the scanning device 110 and the processing device 120). As a further example, the storage device 150 may be connected to the processing device 120 directly or through the network 140. As still a further example, the terminal device 130 may be connected to the processing device 120 directly (as indicated by the bi-directional arrow in dotted lines linking the terminal device 130 and the processing device 120) or through the network 140.

The scanning device 110 may be configured to acquire image data relating to at least one part of a subject. The scanning device 110 may scan the subject or a portion thereof that is located within its detection region and generate image data relating to the subject or the portion thereof.

The image data relating to at least one part of a subject may include an image (e.g., an image slice), projection data, or a combination thereof. In some embodiments, the image data may be two-dimensional (2D) image data, three-dimensional (3D) image data, four-dimensional (4D) image data, or the like, or any combination thereof. In some embodiments, the scanning device 110 may include a single modality imaging device. For example, the scanning device 110 may include a digital subtraction angiography (DSA) device, a positron emission tomography (PET) device, a single-photon emission computed tomography (SPECT) device, a magnetic resonance imaging (MRI) device (also referred to as an MR device, an MR scanner), a computed tomography (CT) device, an ultrasonography scanner, an X-ray imaging device (e.g., a digital radiography (DR) scanner, a computed radiography (CR) scanner), or the like, or any combination thereof. In some embodiments, the scanning device 110 may include a multi-modality imaging device. Exemplary multi-modality imaging devices may include a PET-CT device, a PET-MRI device, or the like, or a combination thereof. For illustration purposes, the present disclosure is described with reference to a CT device.

As shown in FIG. 1, the scanning device 110 may include a gantry 111, a detector 112, a detection region 113, a table 114, a radiation source 115, or any other component(s). The gantry 111 may be configured to provide support for other components (e.g., the radiation source 115, the detector 112, etc.) of the scanning device 110. In some embodiments, the detector 112 (e.g., a scintillation detector such as a cesium iodide detector) and the radiation source 115 (e.g., an X-ray radiation tube) may be oppositely mounted on the gantry 111. In some embodiments, the gantry 111 may rotate and/or move. The detector 112 and the radiation source 115 may rotate along with the rotation of the gantry 111. The table 114 may be configured to locate and/or support the subject. The subject may be placed on the table 114 and moved into the detection region 113 (e.g., a space between the detector 112 and the radiation source 115). The radiation source 115 may emit radiation (e.g., X-rays) towards the subject under the detection region 113. The detector 112 may detect the radiation passing through the subject for acquiring image data relating to the subject, e.g., by multiple detector rows of the detector 112. As used in the present disclosure, the terms "image data" and "scanning data" may be used interchangeably. A time point when the image data is acquired may also be referred to as an acquisition time point corresponding to the image data. A rotation angle of the radiation source 115 or the gantry 111 at the acquisition time point corresponding to the image data may also be referred to as an acquisition angle corresponding to the image data. An acquisition time point corresponding to the image data may correspond to an acquisition angle.

Figure 11:
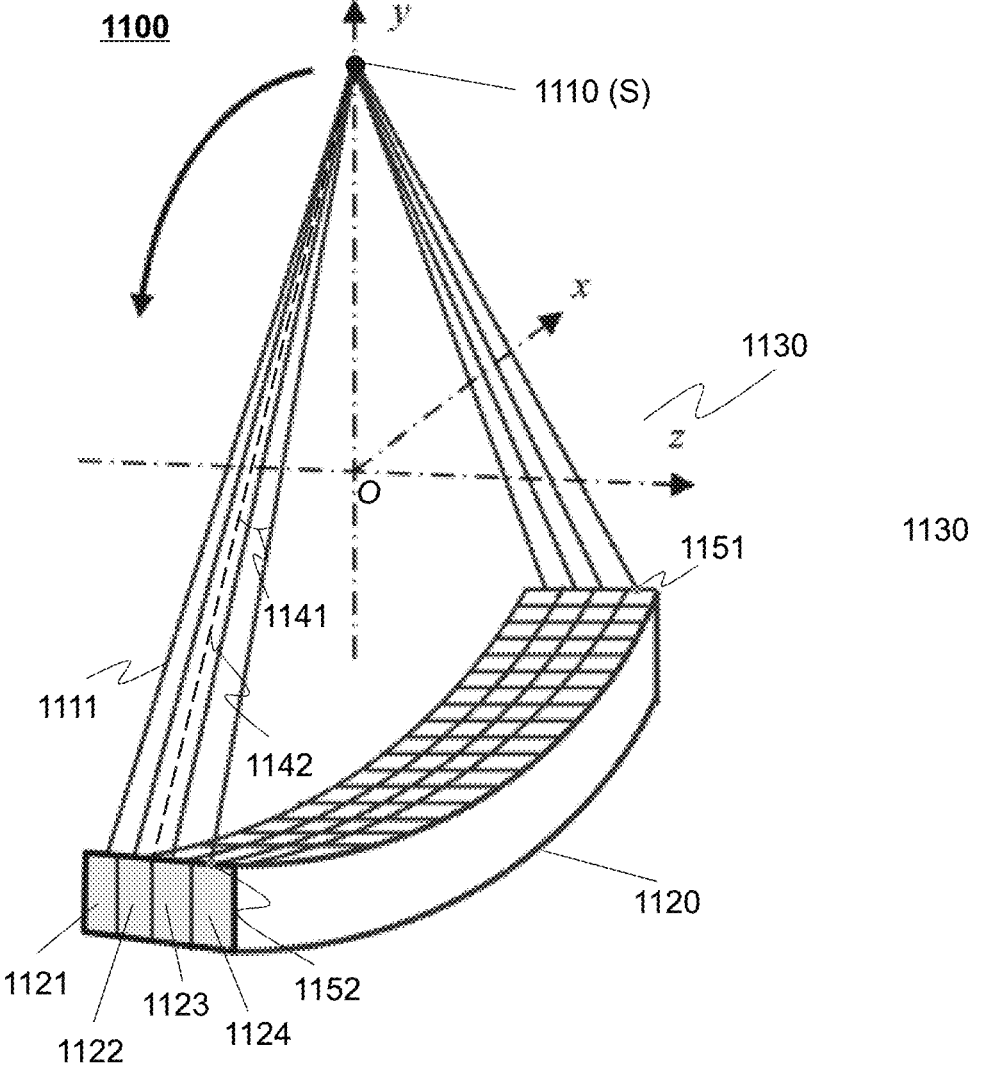
FIG. 11 illustrates an exemplary scanning device according to some embodiments of the present disclosure.

FIG. 11 illustrates an exemplary scanning device according to some embodiments of the present disclosure. The scanning device (e.g., a multi-slice spiral CT scanner) 1100 may be an example of the scanning device 110. The multi-slice spiral CT scanner 1100 may include a radiation source 1110 (also referred to as a radiation source S), a detector 1120 and other components not shown in FIG. 11 (e.g., the table 114, the gantry 111, etc.). The radiation source S may emit a cone-shape beam including a pluriaty of radiation rays 1111 directing to a subject (e.g., the heart of a patient). At least a portion of the cone-shape beam may traverse the subject and be detected by the detector 1120. For illustration purposes, a coordinate system 1130 may be provided for the scanning device 1100 to define a location of a component of the scanning device 1100 (e.g., an absolute location, a location relative to another component) and/or a movement of the component. For example, the coordinate system 1130 may be a right-handed Cartesian system including an x-axis, a y-axis, a z-axis, and an origin O as illustrated in FIG. 11. The x-y plane shown in FIG. 11 may be perpendicular to a longitudinal direction of the table 114 (e.g., a direction along which the table 114 can be moved to the detection region 113 for scanning the subject, or a direction parallel to a rotation axis of the radiation source S), the y-axis passes through the radiation source S, and the z-axis may be parallel to the longitudinal direction. The origin O of the coordinate system 1130 may be located at an isocenter of the multi-slice spiral CT scanner 1100 (e.g., a rotation center of the radiation source S). In some embodiments, the origin of the coordinate system 1130 may be located at any other location relating to the multi-slice spiral CT scanner 1100, e.g., a location of the radiation source S.

In some embodiments, the detector 1120 may include a plurality of detection units (e.g., rectangular detection units) arranged in rows, and rows of detection units arranged along the z-axis may form multiple detector rows (e.g., detector rows 1121, 1122, 1123, and 1124). Detection units within a detector row may have a same z-axis coordinate. A location of each of the multiple detector rows in the detector 1120 may be represented by a specific z-axis coordinate. In some embodiments, the multi-slice spiral CT scanner 1100 may include multiple data acquisition system (DAS) channels. A count (or number) of the multiple DAS channels may be equal to a count (or number) of image slices that can be reconstructed based on image data acquired during a scan by the multi-slice spiral CT scanner 1100. For example, if the multi-slice spiral CT scanner 1100 includes 64 DAS channels, the multi-slice spiral CT scanner 1100 may also be referred to as a 64-slice spiral CT scanner, and image data acquired during a scan by the multi-slice spiral CT scanner 1100 may be used to reconstruct 64 image slices, each of which is generated by image data acquired through one DAS channel. A DAS channel may correspond to one or more of the multiple detector rows. Alternatively, one of the multiple detector rows may correspond to different DAS channels. A DAS channel may process electrical signals of image data (e.g., projection data relating to the subject) acquired by corresponding detector rows for reconstructing an image slice (e.g., by performing amplification, integration, sampling and retention, and digital signals conversion on the electronic signals). The reconstructed image slices may constitute a reconstructed image of the subject. For illustration purposes, assuming that a detector row in the present disclosure may correspond to a DAS channel, the multi-slice spiral CT scanner 1100 in FIG. 11 may include 4 DAS channels corresponding to the detector rows 1121, 1122, 1123, and 1124, respectively. Image data acquired by the detector rows 1121, 1122, 1123, and 1124 may be reconstructed to obtain 4 image slices, respectively.

As the development of a medical imaging device progresses, a count (or number) of "slices" or channels of the multi-slice spiral CT scanner 1100 increases, which may improve the performance of the multi-slice spiral CT scanner 1100. Meanwhile, a count (or number) of the multiple detector rows also increases, thereby increasing the width (e.g., a length along the z-axis as illustrated in FIG. 11) of the detector 1120 and shortening the time of a full scan of the subject (e.g., a scan of the full body of the subject), but also making image reconstruction more challenging. For example, an increase in the count of the detector rows may result in a larger cone angle corresponding to more marginal detector rows of the detector 1120 from which insufficient image data are acquired. As used herein, a marginal detector row refers to a detector row of the multiple detector rows that is relatively close to an end (e.g., an end parallel to the x-axis) of the detector 1120 (e.g., a distance between the detector row and the end of the detector less than a preset distance threshold). The closer a detector row to the end of the detector 1120 is, the fewer image data acquired by the detector row may be. As used herein, a cone angle corresponding to a detector row of the detector 1120 refers to an angle formed by a central plane (e.g., the x-y plane in FIG. 11) of the cone-shaped beam and a fan beam of the cone-shaped beam impinging on the detector row. As used herein, a cone angle corresponding to the detector 1120 refers to an angle formed by the central plane of the cone-shaped beam and a fan beam of the cone-shaped beam impinging on a detector row that is closest to an end of the detector 1120. As shown in FIG. 11, the detector row 1121 and the detector row 1124 of the detector 1120 may be deemed marginal detector rows at the ends of the detector 1120. For example, a fan beam of the cone-shaped beam impinging on the detector row 1124 may be parallel to a plane formed by a center of the radiation source S and midpoints (e.g., points 1151 and 1152) of two ends parallel to the z-axis of the detector row 1124. As another example, the detector row 1124 may correspond to a cone angle (e.g., a cone angle 1141 as shown in FIG. 11) that is larger than a cone angle (e.g., an angle 1142 as shown in FIG. 11) corresponding to the detector row 1123. As further another example, the cone angle corresponding to the detector 1120 may be equal to the cone angle corresponding to the detector row 1121 or 1124. In some embodiments, image data (or scanning data) used for reconstructing an image slice may correspond to a specific cone angle; that is, the image data (or scanning data) used for reconstructing an image slice may be acquired by one or more detector rows corresponding to the specific cone angle. For a situation that the image data associated with an image slice is acquired by a detector row, the specific cone angle may refer to a cone angle corresponding to the detector row. For a situation that the image data associated with an image slice is acquired by more than one detector row (e.g., two detector rows), the specific cone angle may refer to a cone angle corresponding to the more than one detector row. As used herein, the cone angle corresponding to more than one detector row refers to a cone angle corresponding to one of the more than one detector row (e.g., a detector row of the more than one detector row that is closest to the end of the detector 1120) or an average of cone angles each corresponding to one of the more than one detector row.

Merely by way of example, the multi-slice spiral CT scanner 1100 may be used to scan the heart of the subject under a preset scanning angle range (e.g., a width of which is 360°, 240°, etc.) per rotation of the radiation source S. Since the heart undergoes a motion during the scan, an image of the heart (also referred to as a cardiac image) (e.g., a cardiac CT image including multiple cardiac image slices) may need to have a relatively high time resolution for reducing motion artifact(s) in the cardiac image. As used herein, the time resolution of a cardiac image refers to an image data collection duration during which image data associated with the cardiac image is acquired by the multi-slice spiral CT scanner 1100. The shorter the collection duration is, the higher the time resolution of the cardiac image may be. Thus, during traditional reconstruction of a cardiac image, partial or limited image data may be selected from image data acquired during the preset scanning angle range for reconstructing the cardiac image. As used herein, the limited image data refers to image data acquired under a limited angle range within the preset scanning angle range. As used herein, the limited angle range is determined after the scan and used for image reconstruction. A width of the limited angle range may be smaller than that of the preset scanning angle range. Merely by way of example, the preset scanning angle range may be from 0 degrees to 360 degrees and the limited angle range may be from 60 degrees to 240 degrees. The limited image data may further be used to reconstruct the cardiac image for improving the time resolution (e.g., achieving a higher time resolution) of the cardiac image. For instance, the cardiac image may include multiple cardiac image slices corresponding to multiple cone angles. For each cardiac image slice, limited image data corresponding to a same limited angle range may be used for reconstructing the cardiac image slice. However, the use of the limited image data for image reconstruction may further worsen the issues of insufficient image data in addition to the proximity of the marginal detector rows to an end of the detector 1120. In such cases, when a traditional CT reconstruction algorithm is used for reconstruction, a reconstructed image may have a relatively low image quality due to the insufficient image data, e.g., resulting in a dark and/or blurry reconstructed image. Exemplary traditional CT reconstruction algorithms may include a traditional analytical algorithm (e.g., a filtered-back projection (FBP) algorithm), a traditional iterative reconstruction (IR) algorithm (e.g., an algebra reconstruction technique (ART), a simultaneous algebraic reconstruction technique, SART), a maximum likelihood expectation maximum (ML-EM) algorithm. For solving the issues of insufficient image data, different cone angles may correspond to different limited angle ranges. For example, a cardiac image slice corresponding to a first cone angle (i.e., an image slice reconstructed based on image data acquired by a detector row corresponding to the first cone angle) may use image data acquired under a first limited angle range, and a cardiac image slice corresponding to a second cone angle smaller than the first cone angle may use image data acquired under a second limited angle range smaller than the first angle range. That is, the larger the cone angle is (i.e. the closer the detector row(s) that acquire(s) the image data is/are to an end of the detector 1120), the larger the limited angle range corresponding to the image data may need. Alternatively, after the limited angle range is determined, a weight parameter of image data acquired under each acquisition angle of the preset scanning angle range may be determined based on the limited angle range and the acquisition angle. A cardiac image slice may be reconstructed based on the image data acquired under each acquisition angle and the weight parameter corresponding to the each acquaition angle. More descriptions regarding the determination of the limited angle range may be found elsewhere in the present disclosure (e.g., FIG. 14 and relevant description thereof). Additionally, a loss function (e.g., a first loss function) for image reconstruction may be optimized in consideration of the cone angle for improving the image quality, more description of which may be found elsewhere in the present disclosure (e.g., FIG. 6 and the description thereof).

The processing device 120 may process data and/or information obtained from the scanning device 110, the terminal device 130, and/or the storage device 150. For example, the processing device 120 may obtain an initial image to be processed and generate a reconstructed image by performing a plurality of iteration steps on the initial image. At least one of the plurality of iteration steps including a first optimization operation and a second optimization using a machine learning model. As another example, the processing device 120 may obtain the initial image based on image data acquired by the scanning device 110, or a portion thereof. As still another example, the processing device 120 may obtain the machine learning model by training a preliminary machine learning model using a plurality of training samples. In some embodiments, the processing device 120 may include a central processing unit (CPU), a digital signal processor (DSP), a system on a chip (SoC), a microcontroller unit (MCU), or the like, or any combination thereof. In some embodiments, the processing device 120 may include a computer, a user console, a single server or a server group, etc. The server group may be centralized or distributed. In some embodiments, the processing device 120 may be local or remote. For example, the processing device 120 may access information and/or data stored in the scanning device 110, the terminal device 130, and/or the storage device 150 via the network 140. As another example, the processing device 120 may be directly connected to the scanning device 110, the terminal device 130, and/or the storage device 150 to access stored information and/or data. In some embodiments, the processing device 120 may be implemented on a cloud platform (e.g., a private cloud, a public cloud, a hybrid cloud, a community cloud, a distributed cloud, an inter-cloud, a multi-cloud, or the like, or any combination thereof). For instance, the processes relating to image reconstruction (e.g., a sequence and/or process of data processing operations) may be implemented on a same cloud platform or different cloud platforms. Merely by way of example, the training of the machine learning model may be implemented on a first cloud platform, and the image reconstruction may be implemented on a second cloud platform. In some embodiments, the processing device 120 or a portion of the processing device 120 may be integrated into the scanning device 110. In some embodiments, the processing device 120 may be implemented by a computing device 200 including one or more components as described in FIG. 2.

The terminal device 130 may facilitate communication between a user and the scanning device 110. In some embodiments, the terminal device 130 may include a user interface via which the user can communicate with the scanning device 110. For example, the terminal device 130 may receive a user instruction (e.g., a user input) from the user via the user interface. The terminal device 130 may transmit the user instruction (e.g., relating to modify scanning and/or reconstruction parameter(s), evaluate image quality, etc.) to other components (e.g., the processing device 120, the scanning device 110, etc.) of the medical system 100. As another example, the terminal device 130 may display data/information (e.g., the reconstructed image or a portion thereof, recommended parameters (e.g., an iteration count, iteration time) for image reconstruction, scanning parameters) relating to the image reconstruction via the user interface to the user.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the smart mobile device may include a mobile phone, a personal digital assistant (PDA), a gaming device, a navigation device, a point of sale (POS) device, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 130 may be part of the processing device 120.

The network 140 may include any suitable network that can facilitate the exchange of information and/or data for the medical system 100. In some embodiments, one or more components (e.g., the scanning device 110, the processing device 120, the storage device 150, the terminal device 130) of the medical system 100 may communicate information and/or data with one or more other components of the medical system 100 via the network 140. For example, the processing device 120 may obtain data from the scanning device 110 via the network 140. As another example, the terminal device 130 may receive a reconstructed image from the processing device 120 via the network 140. In some embodiments, one or more components (e.g., the scanning device 110, the processing device 120, the storage device 150, the terminal device 130) of the medical system 100 may communicate information and/or data with one or more external resources such as an external database of a third party, etc. For example, the processing device 120 may obtain an optimizing model from a database of a vendor or manufacture (e.g., a manufacture of the scanning device 110) that provides and/or updates the optimizing model. The network 140 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a tele-communications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points, such as base stations and/or internet exchange points, through which one or more components of the medical system 100 may be connected to the network 140 to exchange data and/or information.

The storage device 150 may store data, instructions, and/or any other information. In some embodiments, the storage device 150 may store data obtained from the scanning device 110, the terminal device 130, and/or the processing device 120. In some embodiments, the storage device 150 may store data and/or instructions that the processing device 120 may execute or use to perform exemplary methods described in the present disclosure. In some embodiments, the storage device 150 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented on a cloud platform as described elsewhere in the disclosure.

In some embodiments, the storage device 150 may be connected to the network 140 to communicate with one or more components (e.g., the scanning device 110, the processing device 120, the terminal device 130) of the medical system 100. One or more components of the medical system 100 may access the data or instructions stored in the storage device 150 via the network 140. In some embodiments, the storage device 150 may be directly connected to or communicate with one or more components of the medical system 100. In some embodiments, the storage device 150 may be part of the processing device 120 or the terminal device 130.

It should be noted that the above description of the medical system 100 is merely provided for the purposes of illustration, and not intended to limit the scope of the present disclosure. For persons having ordinary skills in the art, multiple variations and modifications may be made under the teachings of the present disclosure. For example, the medical system 100 may include one or more additional components and/or one or more components of the medical system 100 described above may be omitted. Additionally or alternatively, two or more components of the medical system 100 may be integrated into a single component. A component of the medical system 100 may be implemented on two or more sub-components.

Figure 2:
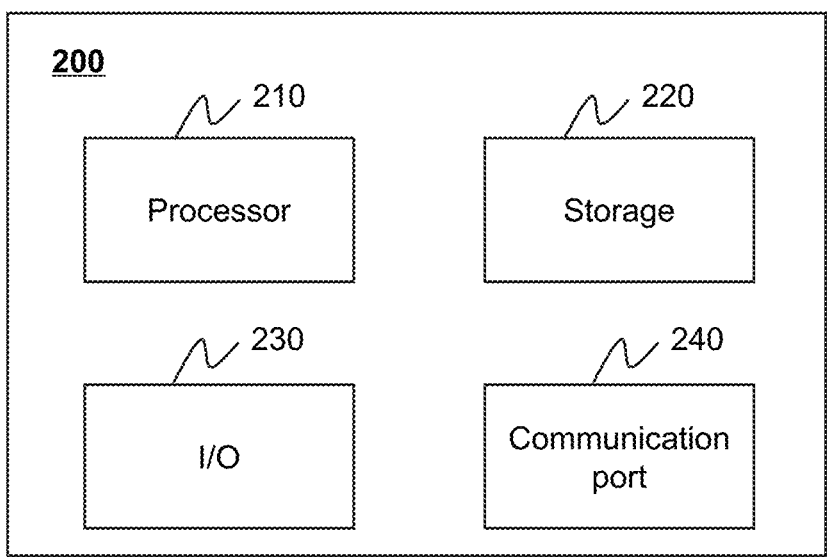
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the medical system 100 as described herein. For example, the processing device 120 and/or the terminal device 130 may be implemented on the computing device 200, respectively, via its hardware, software program, firmware, or a combination thereof. Although only one such computing device is shown, for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, data structures, procedures, modules, and functions, which perform particular functions described herein. For example, the processor 210 may process scanning data obtained from the scanning device 110, the storage device 150, the terminal device 130, and/or any other components of the medical system 100. As another example, the processor 210 may generate a reconstructed image based on the scanning data.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanning device 110, the storage device 150, the terminal device 130, and/or any other component of the medical system 100. In some embodiments, the storage 220 may include a mass storage device, a removable storage device, a volatile read-and-write memory, a read-only memory (ROM), or the like, or a combination thereof. In some embodiments, the storage 220 may store one or more programs and/or instructions to perform exemplary methods described in the present disclosure. For example, the storage 220 may store a program for the processing device 120 to execute to determine an optimizing model. As another example, the storage 220 may store a program for the processing device 120 to execute to apply the optimizing model to determine an optimized image.

The I/O 230 may input and/or output signals, data, information, etc. In some embodiments, the I/O 230 may enable a user interaction with the processing device 120. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 120) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 140) to facilitate data communications. The communication port 240 may establish connections between the processing device 120 and one or more components (e.g., the scanning device 110, the storage device 150, and/or the terminal device 130) of the medical system 100. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
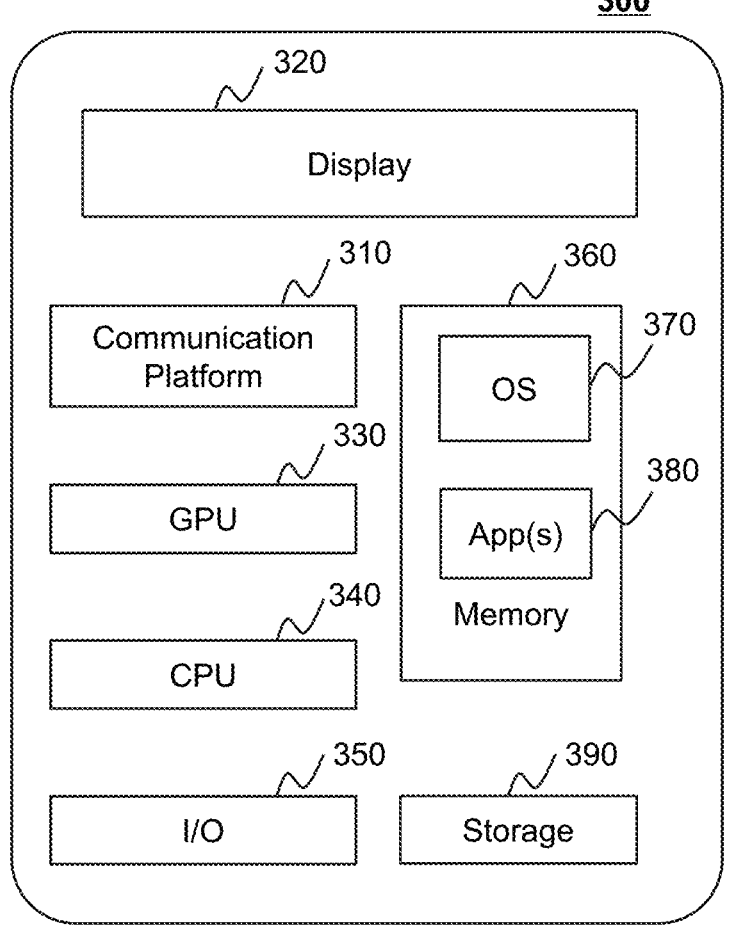
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, one or more components (e.g., the terminal device 130, the processing device 120) of the medical system 100 may be implemented on one or more components of the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the medical system 100. User interactions with the information stream may be achieved via the I/O 350 and provided to the processing device 120 and/or other components of the medical system 100 via the network 140.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
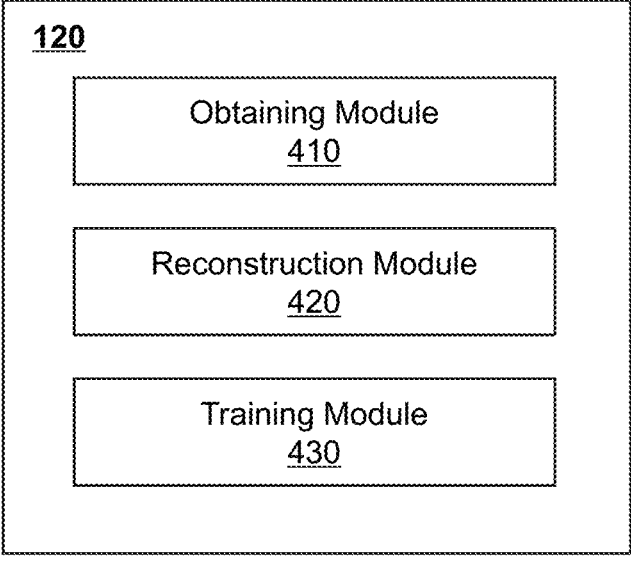
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may be implemented on the computing device 200 (e.g., the processor 210) illustrated in FIG. 2 or the mobile device 300 illustrated in FIG. 3. The processing device 120 may include an obtaining module 410, a reconstruction module 420, and a training module 430.

The obtaining module 410 may be configured to obtain an initial image to be processed. More descriptions regarding the obtaining of the initial image to be processed may be found elsewhere in the present disclosure (e.g., operation 510 and the description thereof).

The reconstruction module 420 may be configured to generate a reconstructed image by performing a plurality of iteration steps on the initial image. In some embodiments, at least one of the plurality of iteration steps may include a first optimization operation and a second optimization operation. In some embodiments, the first optimization operation and the second optimization operation may be executed sequentially. Take a specific iteration step as an example, the first optimization operation may include receiving an image to be processed in the iteration step (e.g., for the first iteration step, the image to be processed is the initial image) and determining an updated image by preliminarily optimizing the image to be processed. The second optimization operation may include determining an optimized image based on the updated image and designating the optimized image as a next image to be processed in a next iteration step or designating the updated image as the reconstructed image. In some embodiments, for the second optimization operation, the reconstruction module 420 may determine the optimized image by optimizing the updated image based on one or more optimizing models (e.g., a machine learning model). More descriptions regarding the generating of the reconstructed image may be found elsewhere in the present disclosure (e.g., operation 520, FIG. 6, FIG. 7, and the description thereof).

The training module 430 may be configured to obtain a plurality of training samples and obtain the optimizing model by training a preliminary optimizing model based on the plurality of training samples. More descriptions regarding the obtaining of the optimizing model may be found elsewhere in the present disclosure (e.g., FIG. 8 and the description thereof).

The modules in the processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined into a single module, and any one of the modules may be divided into two or more units. In some embodiments, the processing device 120 may include one or more additional modules. For example, the reconstruction module 420 and the training module 430 may be combined as a single module which may both generate the reconstructed image and determine the optimizing model. As another example, the reconstruction module 420 may be divided into a first reconstruction unit configured to perform the first optimization operation and a second reconstruction unit configured to perform the second optimization operation. As a further example, the processing device 120 may also include a transmission module (not shown) configured to transmit signals (e.g., electrical signals, electromagnetic signals) to one or more components (e.g., the scanning device 110, the terminal device 130, the storage device 150) of the medical system 100. As a still further example, the processing device 120 may include a storage module (not shown) used to store information and/or data (e.g., the initial image, the updated image, the optimized image) associated with the image reconstruction. As a still further example, the training module 430 may be implemented on a separate device (e.g., a processing device independent from the processing device 120). As a still further example, the training module 430 may be unnecessary and the optimizing model may be obtained from a storage device (e.g., the storage device 150, an external database) disclosed elsewhere in the present disclosure.

Figure 5:
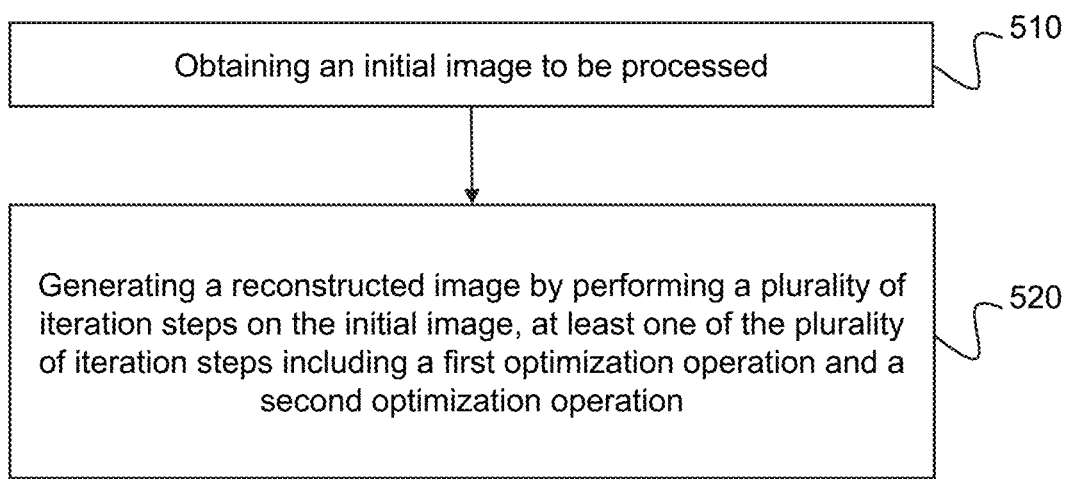
FIG. 5 is a flowchart illustrating an exemplary process for image reconstruction according to some embodiments of the present disclosure.

FIG. 5 is a flowchart illustrating an exemplary process for image reconstruction according to some embodiments of the present disclosure. In some embodiments, process 500 may be executed by the medical system 100. For example, the process 500 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) (e.g., the interface circuits of the processor 210) may obtain an initial image to be processed. As described in connection with FIG. 1, the initial image may include a CT image, an MR image, a PET image, an X-ray image, or the like, or any combination thereof. For illustration purposes, the initial image is described with reference to a CT image.

In some embodiments, the processing device 120 may direct the scanning device 110 to perform a scan (e.g., a CT scan) on an object (e.g., a patient) for obtaining scanning data of the object (also referred to as originally acquired scanning data (e.g., originally acquired projection data) of the object). The processing device 120 may determine the initial image based on originally acquired scanning data or a portion thereof according to a reconstruction algorithm (e.g., a Filter Back Projection (FBP) algorithm). The originally acquired scanning data or the portion based on which the initial image is determined may also be referred to as originally acquired scanning data (e.g., originally acquired projection data) associated with the initial image. In some embodiments, the initial image may be previously determined and stored in a storage device (e.g., the storage device 150, the storage device 220, and/or the storage 390). The processing device 120 may obtain the initial image from the storage device via a network (e.g., the network 140). In some embodiments, the initial image may be a defined image including pixels with defined pixel values (e.g., 0). The defined pixel values may be default settings of the medical system 100 or may be adjustable under different situations.

In some embodiments, in the context of image reconstruction of the heart, a cardiac image may include multiple cardiac image slices, and the initial image may refer to one of the multiple cardiac image slices. For example, the processing device 120 may obtain scanning data of the heart acquired under a preset scanning angle range by a scan of the heart. The heart during the scan may undergo a reciprocating motion including a plurality of motion cycles. Each of the plurality of motion cycles may include multiple phases. A phase in a motion cycle may correspond to a transient state of the heart in the motion cycle. The processing device 120 may determine, among a plurality of multiple phases, a target phase during which the motion of the heart is in a steady state (e.g., a static state). The processing device 120 may determine a target angle (i.e., a target acquisition angle) corresponding to the target phase. For each of the multiple cardiac image slices, the processing device 120 may determine a limited angle range centered at the target angle based on a cone angle corresponding to the cardiac image slice. The limited angle range may be within the preset scanning angle range. A width of the limited angle range may be smaller than that of the preset scanning angle range. For example, if the width of the preset scanning angle range is 360°, the width of the limited angle range within the preset scanning angle range may include 120°, 150°, 180°, 240°, etc. Further, the processing device 120 may generate the cardiac image slice based on the limited angle range. For example, the processing device 120 may obtain scanning data acquired under the limited angle range. The processing device 120 may generate the cardiac image slice based on the scanning data acquired under the limited angle range. Alternatively, the processing device 120 may obtain scanning data acquired under the preset scanning angle range. The scanning data acquired under the preset scanning angle range may include scanning data acquired under a plurality of acquisition angles within the preset scanning angle range. For scanning data acquired at each acquisition angle with the preset scanning angle range, the processing device 120 may determine a weight parameter of the scanning data acquired at the acquisition angle. The processing device 120 may generate the cardiac image slice based on the scanning data acquired at the plurality of acquisition angles and corresponding weight parameters. More descriptions of the determination of the limited angle range and the generation of the cardiac image slice may be found elsewhere in the present disclosure (e.g., FIG. 14 and relevant descriptions). In some embodiments, the originally scanning data associated with the cardiac image slice may be labeled with a label indicating a location of at least one detector row that acquires the originally acquired scanning data in the detector 112 of the medical system 100. For example, the label may include a cone angle corresponding to the at least one detector row, a z-axis coordinate relating to the at least one detector row, a row number of the at least one detector row, etc.

In 520, the processing device 120 (e.g., the reconstruction module 420) (e.g., the processing circuits of the processor 210) may generate a reconstructed image by performing a plurality of iteration steps on the initial image.

In some embodiments, at least one of the plurality of iteration steps may include a first optimization operation and a second optimization operation. For example, each of the plurality of iteration steps may include a first optimization operation and a second optimization operation. As another example, a first iteration step of the plurality of iteration steps may include a first optimization operation, a second iteration step of the plurality of iteration steps may include a first optimization operation and a second optimization operation, and a third iteration step of the plurality of iteration steps may include a second optimization operation. In some embodiments, the first optimization operation and the second optimization operation may be executed sequentially. For example, an optimized result (e.g., an output) of the first optimization operation may be an image to be optimized (e.g., an input) of the second optimization operation. Take a specific iteration step as an example, the first optimization operation may include receiving an image to be processed in the iteration step (e.g., for the first iteration step, the image to be processed is the initial image) and determining an updated image by preliminarily optimizing the image to be processed (e.g., according to a first loss function relating to a difference between forward projection data associated with the image to be processed and the originally acquired projection data associated with the initial image). The second optimization operation may include determining an optimized image by optimizing the updated image and designating the optimized image as a next image to be processed in a next iteration step (e.g., for the last iteration step, the optimized image is designated as the reconstructed image). In some embodiments, the second optimization operation may include determining an optimized image using a machine learning model. For example, for the second optimization operation, the processing device 120 may determine the optimized image by optimizing the updated image based on at least one optimizing model (e.g., at least one machine learning model). Each of the at least one optimizing model may correspond to one of the different types of optimization goals. Exemplary optimization goals may include reducing interference information (e.g., noise information, artifact information) of the updated image, improving a gray distribution of the updated image, improving a global gray scale of the updated image, improving a resolution of the updated image, improving the contrast of the updated image, enhancing the updated image, or the like, or any combination thereof. In some embodiments, the at least one optimizing model may be applied in series to achieve the different types of optimization goals. That is, the at least one optimizing model may be applied in series to optimize the updated image. In some embodiments, the at least one optimizing model may be applied in parallel to achieve the different types of optimization goals. That is, the at least one optimizing model may be applied in parallel to optimize the updated image. In some embodiments, there may be only one optimizing model that is applied to reduce the interface information in the second optimization operation. For example, the only one optimizing model may include sub-models arranged in series or in parallel to reduce the interface information of the updated image. More descriptions of the iteration step may be found elsewhere in the present disclosure (e.g., FIG. 6 and the description thereof).

In some embodiments, also take a specific iteration step as an example, the processing device 120 may determine whether a termination condition is satisfied in the current iteration step. Exemplary termination conditions may include that a certain count of iteration steps has been performed, the optimized image in the current iteration step has reached a desired image quality (e.g., a noise rate is less than a threshold), etc. The certain count may be a default value of the medical system 100, manually set by a user or an operator, or determined by the processing device 120 according to an actual need. In some embodiments, whether the termination condition is satisfied may be determined manually by a user or an operator. For example, the reconstructed image may be displayed on an interface (e.g., the user interface) implemented on, for example, the terminal device 130, and the user or the operator may input an evaluation result regarding whether the optimized image has reached desired image quality.

If it is determined that the termination condition is satisfied in the current iteration step, the processing device 120 may designate the optimized image determined in the second optimization operation in the current iteration step as the reconstructed image. If it is determined that the termination condition is not satisfied in the current iteration step, the processing device 120 may proceed to a next iteration step until the termination condition is satisfied.

In some embodiments, also take a specific iteration step as an example, the processing device 120 may determine whether a portion of the optimized image (e.g., an image block of the optimized image) has satisfied a desired image quality. In response to determining that the portion of the optimized image has satisfied the desired image quality, the processing device 120 may determine the optimized image has satisfied the desired image quality. Thus, the termination condition may be satisfied, and the optimized image may be designated as the reconstructed image. Alternatively, in the context of image reconstruction of the heart, the reconstructed image of the heart may include multiple reconstructed image slices. The processing device 120 may determine multiple optimized image slices in the iteration step corresponding to the multiple reconstructed image slices respectively. The processing device 120 may determine whether a portion of the multiple optimized image slices satisfies a desired image quality. In response to determining that the portion of the multiple image slices satisfies the desired image quality, the processing device 120 may determine all of the multiple updated image slices satisfy the desired image quality. Thus, the termination condition may be satisfied, and the multiple updated image slices may be designed as the multiple reconstructed image slices to generate the reconstructed image of the heart. In such cases, an efficiency of the image reconstruction may be improved by reducing the consumed-time of the image reconstruction in comparison with evaluating all of the optimized image and/or all of the optimized image slices.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional transmitting operation in which the processing device 120 may transmit the reconstructed image to the terminal device 130. As another example, the process 500 may include an additional storing operation in which the processing device 120 may store information and/or data (e.g., the initial image, the updated image, the optimized image) associated with the image reconstruction in a storage device (e.g., the storage device 150, the storage 220, the storage 390) disclosed elsewhere in the present disclosure.

Figure 6:
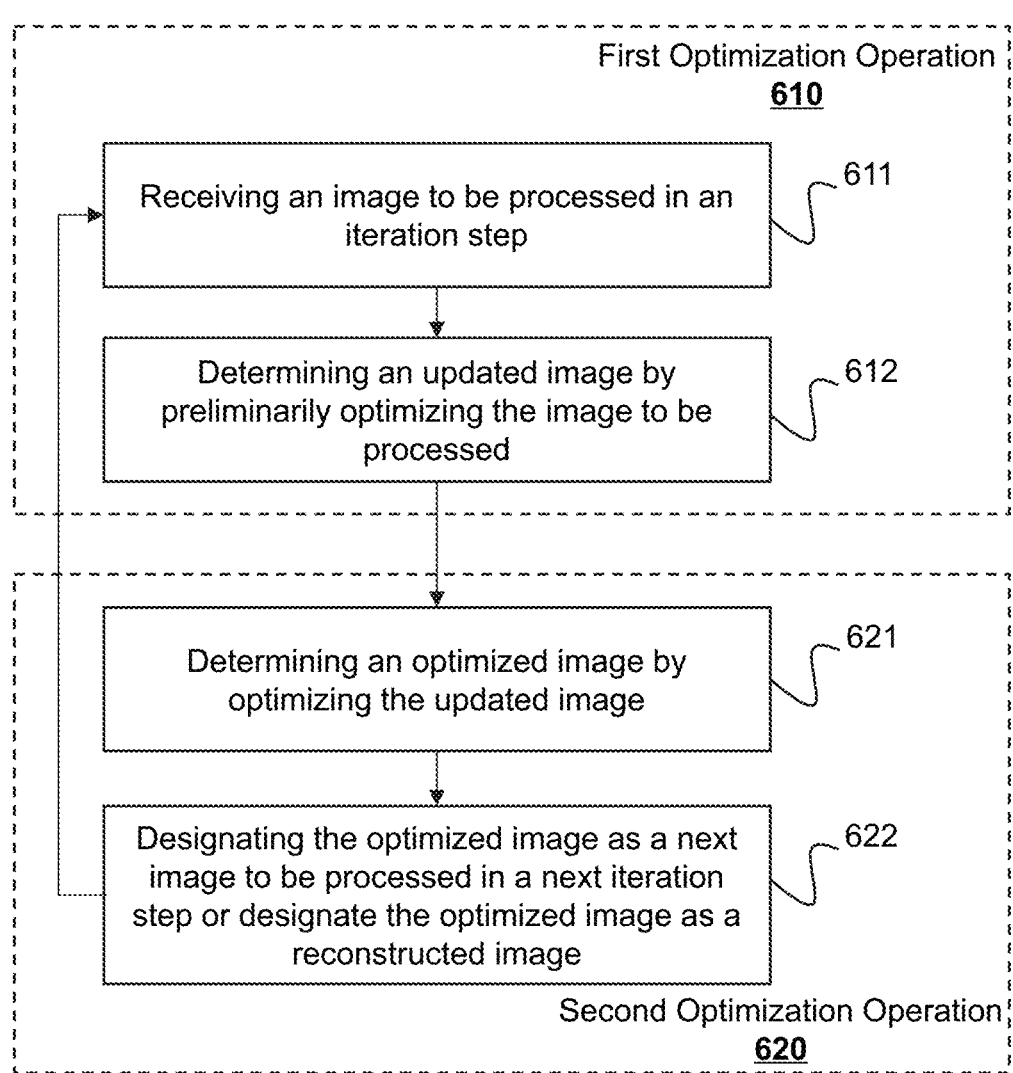
FIG. 6 is a flowchart illustrating an exemplary process for an iteration step according to some embodiments of the present disclosure.

FIG. 6 is a flowchart illustrating an exemplary process for an iteration step according to some embodiments of the present disclosure. In some embodiments, process 600 may be executed by the medical system 100. For example, the process 600 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

As described in connection with FIG. 5, each of the plurality of iteration steps may include a first optimization operation 610 and a second optimization operation 620. The first optimization operation 610 may include an operation 611 and an operation 612. The second optimization operation 620 may include an operation 621 and an operation 622.

In 611, the processing device 120 (e.g., the reconstruction module 420) (e.g., the processing circuits of the processor 210) may receive an image to be processed in the iteration step. For example, for the first iteration step, the image to be processed is the initial image; for subsequent iteration steps, the image to be processed is an optimized image determined in a previously adjacent iteration step.

In 612, the processing device 120 (e.g., the reconstruction module 420) (e.g., the processing circuits of the processor 210) may determine an updated image by preliminarily optimizing the image to be processed.

Taking the image to be processed of a CT image as an example, the processing device 120 may determine forward projection data by performing a forward projection transformation on the image to be processed in the iteration step. According to the forward projection transformation, the processing device 120 may transform data (e.g., the image to be processed) in an image domain to data (e.g., the forward projection data) in a projection domain. In some embodiments, the processing device 120 may transform the image to be processed into forward projection data by multiplying the image to be processed by a forward projection matrix. As used herein, the forward projection matrix may be a default setting of the medical system 100 or may be adjustable under different situations.

Further, the processing device 120 may determine the updated image in the iteration step by optimizing the image to be processed according to a first loss function. The first loss function may be related to a difference between the forward projection data associated with the image to be processed and originally acquired projection data associated with the initial image. As used herein, the originally acquired projection data associated with the initial image refers to original projection data acquired by the scanning device 110 (e.g., at least one detector arrow of the scanning device 110), for example, original projection data upon which the initial image is determined. For example, the first operation in the iteration step itself may include an iterative operation. The processing device 120 may iteratively optimize the image to be processed until a value of the first loss function satisfies a termination condition in the iteration step.

As another example, the processing device 120 may determine the updated image based at least in part on back projection data of a weighted error between the forward projection data and the originally acquired projection data associated with the initial image. For instance, the processing device 120 may obtain the originally acquired projection data from the scanning device 110 or a storage device (e.g., the storage device 150, the storage device 220, and/or the storage 390) via a network (e.g., the network 140). The processing device 120 may obtain a first quality weight based on the originally acquired projection data. The first quality weight may be associated with a quality of the originally acquired projection data. For example, the processing device 120 may determine the first quality weight based on interference information (e.g., noise information, artifact information) in the originally acquired projection data. As another example, the processing device 120 may determine the first quality weight based on parameters (e.g., X-ray intensity) for acquiring the originally acquired projection data. As still another example, the processing device 120 may determine the first quality weight based on a signal-to-noise ratio (SNR) of the originally acquired projection data. In such cases, the first quality weight may be a constant value (e.g., a global constant that does not vary with a change of the acquisition angle and/or detector location). The processing device 120 may determine the weighted error between the forward projection data and originally acquired projection data based on the first quality weight, the forward projection data, and the originally acquired projection data. For example, the processing device 120 may determine a difference between the forward projection data and originally acquired projection data as an error between the forward projection data and originally acquired projection data. The processing device 120 may determine the weighted error based on the error and the first quality weight. Alternatively, the processing device 120 may determine a quality feature of the image to be processed in the iteration step and determine a second quality weight based on the quality feature. The second quality weight may be associated with a quality of the image to be processed. More descriptions regarding the quality feature may be found elsewhere in the present disclosure (e.g., operation 621 and the description thereof). More descriptions regarding the second quality weight may be found elsewhere in the present disclosure (e.g., FIG. 8 and the description thereof). Further, the processing device 120 may determine the weighted error based on the error and the second quality weight.

Further, the processing device 120 may determine the back projection data of the weighted error by performing a backward projection transformation on the weighted error. According to the back projection transformation, the processing device 120 may transform data (e.g., the weighted error) in a projection domain to data (e.g., the back projection data) in an image domain. For example, the processing device 120 may determine the back projection data of the weighted error by multiplying the weighted error by a back projection matrix. Similarly, the back projection matrix may be a default setting of the medical system 100 or may be adjustable under different situations. The processing device 120 may determine the updated image based on the back projection data of the weighted error.

In some embodiments, the first loss function may include a fidelity term that relates to a difference between the forward projection data and originally acquired projection data associated with the initial image. For example, the processing device 120 may determine the updated image based on the first loss function including the fidelity term according to formula (1) below:

$$U_k = \underset{V_{k-1}}{\arg\min} L = \frac{1}{2}(AV_{k-1} - f)^2, \tag{1}$$

where $\frac{1}{2}(AV_{k-1} - f)^2$ refers to the fidelity term, $U_k$ refers to an updated image in a kth iteration step, $V_{k-1}$ refers to an optimized image in a (k−1)th iteration step (i.e., an image to be processed in the kth iteration step), L refers to a loss function (i.e., the first loss function), A refers to the forward projection matrix, f refers to the originally acquired projection data associated with the initial image, $(AV_{k-1} - f)$ refers to the error (i.e., the difference) between the forward projection data and the originally acquired projection data, and $\frac{1}{2}(AV_{k-1} - f)^2$ refers the fidelity term of the loss function L. In some embodiments, the processing device 120 may determine the updated image by solving the formula (1). In some embodiments, the processing device 120 may solve the formula (1) by using the Newton's algorithm or a gradient descent algorithm.

For example, the processing device 120 may determine the updated image based on the back projection data of the weighted error by solving the formula (1) above by using Newton's algorithm according to formula (2) below:

$$U_k = V_{k-1} - \alpha \frac{A^T(AV_{k-1} - f)_w}{A^T(A\mathbb{1})_w}, \tag{2}$$

where $U_k$ refers to an updated image in a kth iteration step, $V_{k-1}$ refers to an optimized image in a (k−1)th iteration step (i.e., an image to be processed in the kth iteration step), f refers to the originally acquired projection data associated with the initial image, A refers to the forward projection matrix, $A^T$ refers to the back projection matrix, w refers to the first quality weight or the second quality weight, $(AV_{k-1} - f)_w$ refers to the weighted error, $A^T(AV_{k-1} - f)_w$ refers to the back projection data of the weighted error, $A\mathbb{1}$ refers to an operation for performing a forward projection transformation on an image with all pixel values of 1, and α refers to an iteration step length of the iteration step, which may be a default setting of the medical system 100 or may be adjustable under different situations.

In some embodiments, besides the fidelity term, the first loss function may include at least one of a classical regularization term or a machine learning regularization term that involves a machine learning model (e.g., a deep learning model) as described elsewhere in the present disclosure. For example, the processing device 120 may determine the updated image based on the first loss function including the classical regularization term according to formula (3) below:

$$U_k = \underset{V_{k-1}}{\arg\min} L = \frac{1}{2}(AV_{k-1} - f)^2 + R(V_{k-1}), \tag{3}$$

where $R(V_{k-1})$ refers to the classical regularization term, R refers to a function with a defined form, and an independent variable of R is $V_{k-1}$ (i.e., an image to be processed in the kth iteration step). The classical regularization term may include a total variation, a Generalized Gaussian Markov Random Field (GGMRF), etc. In some embodiments, the processing device 120 may determine the updated image by solving the formula (3) using the Newton's algorithm or a gradient descent algorithm, which is similar to how the formula (1) is solved. As another example, the processing device 120 may determine the updated image based on the first loss function including the machine learning regularization term according to formula (4) below:

$$U_k = \underset{V_{k-1}}{\arg\min} L = \frac{1}{2}(AV_{k-1} - f)^2 + DL(V_{k-1}, \theta_{(k-1)}), \tag{4}$$

where $DL(V_{k-1}, \theta_{(k-1)})$ refers to the machine learning regularization term, DL refers to the machine learning model, $V_{k-1}$ refers to an input of the machine learning model in the kth iteration step, and $\theta_{(k-1)}$ refers to learnable parameters (e.g., a value of a convolution kernel of a convolutional layer of the machine learning model) in a network of the machine learning model involved in the machine learning regularization term for the kth iteration step. In some embodiments, $\theta_{(k-1)}$ may be determined by training the machine learning model for the kth iteration step. The training of the machine learning model may be performed offline, similar to the training of an optimizing model, details of which can be found, e.g., in FIG. 8 and the description thereof. In some embodiments, the formula (4) may be solved using the Newton's algorithm or the gradient descent algorithm, similar to how the formula (1) is solved. In some embodiments, the machine learning model may include auxiliary input(s) determined based on the image to be processed and/or the originally acquired projection data according to a certain function or model. For example, $DL(V_{k-1}, \theta_{(k-1)})$ in formula (4) may be expressed as formula (5) below:

$$DL(V_{k-1}, \text{para2}_{(k-1)}, \theta_{(k-1)}), \tag{5}$$

where $\text{para2}_{(k-1)}$ refers to the auxiliary input(s) of the machine learning model of the machine learning regularization term. In some embodiments, the auxiliary input(s) may include a quality feature of the image to be processed, a quality feature of the originally acquired projection data, etc., details of which may be found elsewhere in the present disclosure (e.g., FIG. 8 and relevant description thereof).

In some embodiments, the first loss function may include both the classical regularization term and the machine learning regularization term. Additionally, the first loss function (e.g., the loss function L) may include one or more additional parameters related to the fidelity term, the classical regularization term, and/or the machine learning regularization term. Merely by way of example, the processing device 120 may determine the updated image based on the first loss function including the classical regularization term and the machine learning regularization term, and one or more additional parameters according to formula (6) below:

$$U_k = \underset{V_{k-1}}{\arg\min} L = \lambda_{1,n} S^{-1} A^T W (A V_{k-1} - f) + \tag{6}$$
$$\lambda_{2,n} R\left(V^{(k-1)}, \text{para1}_{(k-1)}\right) + \lambda_{3,n} DL\left(V^{(n-1)}, \text{para2}^{(n-1)}, \theta^{(n-1)}\right),$$

where W and S refer to diagonal matrixes corresponding to the originally acquired projection data and the image to be processed, respectively, $\lambda_{1,n}$, $\lambda_{2,n}$, and $\lambda_{3,n}$ refer to iteration step lengths respectively related to the fidelity term, the classical regularization term, and the machine learning regularization term of the kth iteration step, $\text{para1}_{(k-1)}$ refers to function parameter(s) of R that may be determined based on the image to be processed and the originally acquired projection data according to a certain function, $\lambda_{1,n} S^{-1} A^T W (A V_{k-1} - f)$ refers to the fidelity term of the loss function L, and $\lambda_{2,n} R(V^{(k-1)}, \text{para1}_{(k-1)})$ refers to the classical regularization term. In some embodiments, different iteration steps may include different additional parameters. For example, different iteration steps may have different combinations of W, S, $\lambda_{1,n}, \lambda_{2,n}$ and/or $\lambda_{3,n}$ in which the value of at least one of the additional parameters in the combination of one iteration is different from the value of at least one of the additional parameters in a combination of another iteration. In some embodiments, a ratio of $\lambda_{2,n}$ to $\lambda_{3,n}$ may also be referred to as a ratio of the classical regularization term to the machine learning regularization term. The tatios of $\lambda_{2,n}$ to $\lambda_{3,n}$ in different iteration steps may be the same or different. For example, a first ratio of the classical regularization term to the machine learning regularization term in a first iteration step may be different from a second ratio of the classical regularization term to the machine learning regularization term in a second iteration step. In some embodiments, the formula (6) may be solved using the Newton's algorithm or the gradient descent algorithm, similar to how the formula (1) is solved.

In some embodiments, the one or more additional parameters may include a weight-related parameter. The weight-related parameter may include at least one of the first quality weight associated with a quality of the originally acquired projection data, the second quality weight associated with a quality of the image to be processed, or a third weight associated with a cone angle corresponding to at least one detector row that acquires the originally acquired projection data (also referred to as a third weight associated with a cone angle corresponding to the initial image or originally acquired image data). Accordingly, the first loss function may relate to at least one of the first quality weight, the second quality weight, or the third weight associated with a cone angle corresponding to at least one detector row that acquires the originally acquired projection data.

In some embodiments, the weight-related parameter may be associated with the fidelity term of the first loss function. Merely by way of example, the processing device 120 may determine the updated image based on the first loss function including the fidelity term associated with the weight-related parameter and the classical regularization term according to formula (7) below:

$$U_k = \underset{V_{k-1}}{\arg\min} L = \|A V_{k-1} - f\|_{w'}^2 + \beta R(V_{k-1}), \tag{7}$$

where $\|A V_{k-1} - f\|_{w'}^2$ refers to the fidelity term, w' refers to the weight-related parameter, $\beta R(V_{k-1})$ refers to the classical regularization term, and refers to a regularization coefficient which may be similar to $\lambda_{2,n}$ in formula (6). For example, the weight-related parameter may include one of the first quality weight, the second quality weight, or the third weight. As another example, for cardiac image reconstruction, the weight-related parameter may include both the first quality weight and the third weight as expressed in formula (8) below:

$$w' = w_s * w_{cone}, \tag{8}$$

where $w_s$ refers to the first quality weight, and $w_{cone}$ refers to the third weight. In some embodiments, the processing device 120 may determine the third weight based on a cone angle corresponding to the at least one detector row that acquires the originally acquired projection data (e.g., an average of at least one cone angle each corresponding to one of the at least one detector row). The third weight may be positively related to the cone angle. The larger the cone angle is, the greater the third weight may be.

In 621, the processing device 120 (e.g., the reconstruction module 420) (e.g., the processing circuits of the processor 210) may determine an optimized image by optimizing the updated image. In other words, after performing the preliminary optimization on the image to be processed in the iteration step, the processing device 120 may perform a further optimization.

In some embodiments, the optimizing the updated image may include reducing (or eliminating) interference information of the updated image, improving a gray distribution of the updated image, improving a global gray scale of the updated image, improving a resolution of the updated image, improving the contrast of the updated image, enhancing the updated image, or the like, or any combination thereof. For illustaration purposes, the following description may be described with reference to reducing the interference information of the updated image.

In some embodiments, the interference information may correspond to different types including at least one of noise information and/or artifact information. The noise information may refer to information related to a noise feature in an image, for example, a noise distribution, a noise intensity, a global noise intensity, a noise rate, etc. The artifact information may refer to information related to an artifact feature in an image, for example, an artifact distribution, an artifact intensity, a global artifact intensity, an artifact rate, etc.

In some embodiments, the processing device 120 may determine the optimized image by reducing interference information of the updated image based on at least one optimizing model (e.g., an optimizing model) or at least one optimizing algorithm (e.g., an optimizing algorithm). In some embodiments, the optimizing algorithm may include a mean filter, an order statistics filter, a smoothing filter, or the like, or any combination thereof. The mean filter may include an arithmetic mean filter, a geometric mean filter, a harmonic mean filter, an inverse harmonic mean filter, or the like, or any combination thereof. The order statistics filter may include a median filter, a two-dimensional (2D) median filter, a modified alpha mean filter, a max/min filter, or the like, or any combination thereof. The smoothing filter may include a local smoothing filter, a super pixel smoothing filter, a spatial low-pass filter, or the like, or any combination thereof.

In some embodiments, the optimizing model may be pre-trained and stored in a storage device (e.g., the storage device 150) disclosed elsewhere in the present disclosure. The processing device 120 may retrieve the optimizing model from the storage device. In some embodiments, the optimizing model may include a machine learning model, for example, a deep learning model such as a neural network model. The neural network model may include a multi-layer perceptron (MLP) model, a deep neural network (DNN) model, a convolutional neural network (CNN) model, a deep convolutional encoder-decoder (DCED) network model, a generative adversarial network (GAN) model, or the like, or any combination thereof. In some embodiments, the optimizing model may be trained based on a plurality of training samples. More descriptions regarding the optimizing model may be found elsewhere in the present disclosure (e.g., FIG. 8 and the description thereof).

In some embodiments, the processing device 120 may determine a quality feature of the updated image. Further, the processing device 120 may determine the optimized image by inputting the updated image and the quality feature into the optimizing model. The quality feature may include a noise feature, an artifact feature, a gray distribution (e.g., a distribution of pixel gray values of the image), a global gray scale (e.g., an average gray value of the pixel gray values, a weighted average gray value of the pixel gray values), a resolution (e.g., a sharpness degree of the image), a contrast (e.g., a grayscale contrast) of the image to be processed, or the like, or any combination thereof. In some embodiments, the qulity feature input to the optimizing model may relate to an optimizing goal of the optimizing model. For example, for an optimizing model for reducing the noise information of the updated image, the nosie feature of the updated image and the updated image may be input to the optimizing model to ouput the optimized image. As another example, for an optimizing for reduing the artifact information of the updated image, the artifact feature of the updated image and updated image may be input to the optimizing model to output the optimized image. As still another example, for an optimizing for improving the gray distribution (or the global gray scale, the resolution, the contrast, etc.) of the updated image using the optimizing model, the gray distribution (or the global gray scale, the resolution, the contrast, etc.) of the updated image and updated image may be input to the optimizing model to output the optimized image.

As used herein, a noise of an image refers to a random error in the image, which may result in an appearance of mottling, grain, texture, snowflake, etc. in the image. Exemplary noise features may include a noise distribution, a noise intensity, a global noise intensity, a noise rate, or the like, or any combination thereof. In some embodiments, a noise intensity may refer to a value of a noise pixel which reflects an amplitude of the noise in the noise pixel, accordingly, the noise distribution may reflect probability densities of noises with different noise intensities in the image; the global noise intensity may reflect an average noise intensity or a weighted average noise intensity in the image; and the noise rate may reflect a dispersion degree of the noise distribution. In some embodiments, the processing device 120 may determine the noise feature based on a statistical noise model and/or a probability density function (PDF) corresponding to the statistical noise model. For example, the processing device 120 may determine a representation (e.g., a curve, a value, a vector, a matrix) of the noise distribution according to the statistical noise model and/or the PDF. As another example, the processing device 120 may determine the global noise intensity based on an average value or a weighted value associated with the representation of the noise distribution. As a further example, the processing device 120 may determine the noise rate based on a variance and/or a standard deviation of the representation of the noise distribution. As a still further another example, for raw CT data, the processing device 120 may determine a statistic noise model corresponding to the raw CT data by estimating statistical noise characteristics of X-rays used to acquire the raw CT data. Further, the processing device 120a may determine noise feature(s) of the raw CT data based on the statistic noise model and a reconstruction algorithm which may be used to reconstruct the raw CT data. Exemplary statistical noise models may include a Gaussian noise model, an impulse noise model, a Rayleigh noise model, an exponential distribution noise model, a uniform distribution noise model, or the like, or any combination thereof. In some embodiments, the processing device 120 may determine the noise feature of the image using an image block algorithm, a filter algorithm, a spatial sampling algorithm, a Bayesian estimation algorithm, or the like, or any combination thereof.

As used herein, an artifact of an image refers to a portion of an image that does not correspond to any part that actually exists in the subject of the image, which may result in image distortion, image overlap, image loss, image blur, etc. Exemplary artifact features may include an artifact distribution, an artifact intensity, a global artifact intensity, an artifact rate, or the like, or any combination thereof. In some embodiments, an artifact intensity may refer to a value of an artifact pixel which reflects an amplitude of the artifact in the artifact pixel. In some embodiments, the processing device 120 may identify an artifact in the image and determine the artifact intensity based on a feature (e.g., a texture, a shape) of the artifact. In some embodiments, the processing device 120 may determine the feature of the artifact using a feature extraction algorithm. Exemplary extraction algorithms may include a histogram of oriented gradients, a local binary pattern (LBP) algorithm, a scale invariant feature transform (SIFT) algorithm, a Haar-like algorithm, a gray-level co-occurrence matrix (GLCM) algorithm, a Hough transform algorithm, a Fourier transform algorithm, a Fourier shape deors algorithm, a shape factor algorithm, a finite element method (FEM) algorithm, a turning algorithm, a wavelet deor algorithm, etc. Further, similar to the noise feature, the artifact distribution may reflect probability densities of arti-facts with different intensities in the image; the global artifact intensity may reflect an average artifact intensity or a weighted average artifact intensity in the image; and the artifact rate may reflect a dispersion degree of the artifact distribution. Similarly, the processing device 120 may also determine the artifact feature based on a statistical model and/or a probability density function (PDF) corresponding to the statistical model.

In some embodiments, the updated image may include different types of interference information (e.g., the noise information, the artifact information). In order to eliminate the different types of interference information as much as possible, the processing device 120 may determine an opti-mizing model corresponding to each type of interference information. For example, the processing device 120 may determine an artifact optimizing model for reducing or eliminating the artifact information of the updated image. As another example, the processing device 120 may determine a noise optimizing model for reducing or eliminating the noise information of the updated image.

In some embodiments, the processing device 120 may determine an initial feature (e.g., a feature associated with an object included in the updated image, a feature associated with a type of a scanning device upon which the updated image (or the image to be processed) is obtained) of the updated image and select an optimizing model based on the initial feature.

In some embodiments, the processing device 120 may execute a plurality of interference information reduction operations (i.e., operation 621) on the updated image to determine the optimized image. The plurality of interference information reduction operations may be executed based on a plurality of optimizing algorithms or optimizing models. In some embodiments, the plurality of optimizing models may be models of different types. In some embodiments, the plurality of optimizing models may be models of the same type but the same structure or different structures. For example, the plurality of optimizing models may be deep neural network models with different numbers of neural networks or/and different numbers of neurons. As another example, the plurality of optimizing models may be deep neural network models with different activation modes and/ or different model structures.

In some embodiments, the processing device 120 may execute the plurality of interference information reduction operations on the updated image sequentially. For example, the processing device 120 may designate a result image obtained in the current interference information reduction operation as a next updated image in a next interference information reduction operation. Further, the processing device 120 may designate a result image obtained in the last interference information reduction operation as the optimized image. For instance, the processing device 120 may determine at least one optimizing model each corresponding to one of the different types of interference information included in the updated image. The at least one optimizing model may be applied in series to reduce the interference information of the different types. For instance, the at least one optimizing model includes a first optimizing model configured to reduce the interference information of a first type, a second optimizing model configured to reduce the interference information of a second type, and a third optimizing model configured to reduce the interference information of a third type. The first optimizing model, the second optimizing model, and the third optimizing model may be applied in series such that the output of the first optimizing model may be used as input to the second optimizing model, and the output of the second optimizing model may be used as input to the third optimizing model. Alternatively, the at least one optimizing model may be applied in parallel to reduce the interference information of the different types. For instance, the updated image may be input to the first optimizing model, the second optimizing model, and the third optimizing model, respectively, to output a first image, a second image, and a third image, respectively. Subsequently, the processing device 120 may determine the optimized image based on the updated image and result images (e.g., the first image, the second image, and the third image) of the at least one optimizing model. For example, the processing device 120 may determine the interference information of the first type in the updated image based on the first image and the updated image. The processing device 120 may determine the interference infor-mation of the second type in the updated image based on the second image and the updated image. The processing device 120 may determine the interference information of the third type based on the third image and the updated image. Further, the processing device 120 may determine the opti-mized image by removing the interferenc information of the first type, the second type and the third type from the updated image.

In some embodiments, the processing device 120 may execute the plurality of interference information reduction operations on the updated image in parallel. For example, the processing device 120 may determine a plurality of result images in the plurality of interference information reduction operations. Further, the processing device 120 may determine an average result or a weighted average result of the plurality of result images as the optimized image. In some embodiments, for each of the plurality of result images, the processing device 120 may determine a weight corresponding to the result image based on the optimizing algorithm, model parameters of the optimizing model, a type of the interference information, etc. For example, for a result image obtained based on an optimizing model with relatively more layers, the weight may be relatively high. For instance, for a specific type of interfer-ence information, the processing device 120 may determine at least one optimizing model; the at least one optimizing model may be applied in parallel to reduce the specific type of interference information. At least one result image of the at least one optimizing model may correspond to different weights. In some embodiments, the parallel execution of the plurality of interference information reduction operations can reduce a loss of real information in the optimized image.

In 622, the processing device 120 (e.g., the reconstruction module 420) (e.g., the processing circuits of the processor 210) may designate the optimized image as a next image to be processed in a next iteration step or designate the optimized image as a reconstructed image.

As described in connection with FIG. 5, the processing device 120 may determine whether a termination condition is satisfied after determining the optimized image. If it is determined that the termination condition is satisfied, the processing device 120 may designate the optimized image as the reconstructed image. If it is determined that the termination condition is not satisfied, the processing device 120 may designate the optimized image as the next image to be processed and execute the first optimization operation 610 in the next iteration step.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
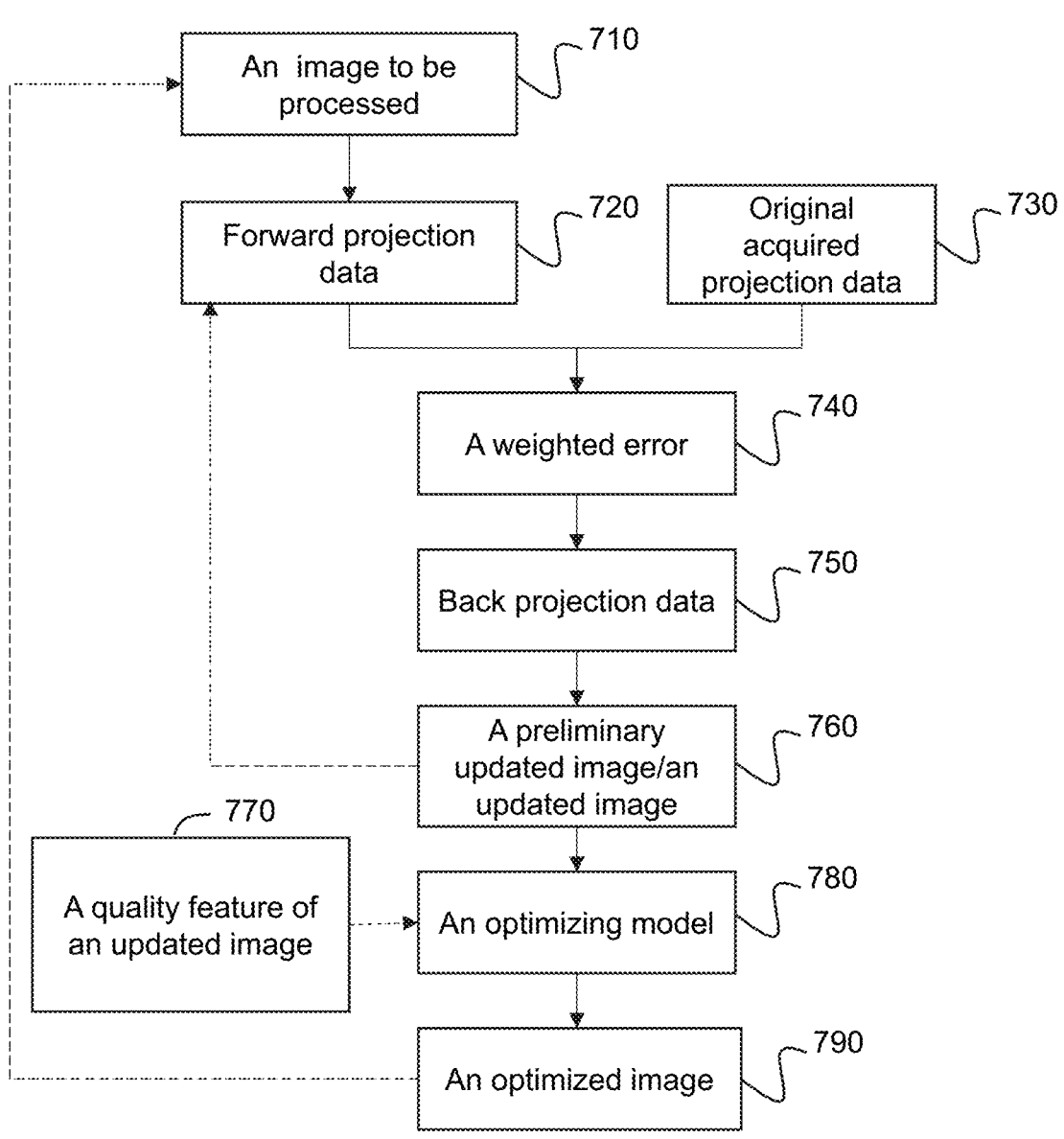
FIG. 7 is a flowchart illustrating an exemplary process for image reconstruction according to some embodiments of the present disclosure.

FIG. 7 is a flowchart illustrating an exemplary process for image reconstruction according to some embodiments of the present disclosure. In some embodiments, process 700 may be executed by the medical system 100. For example, the process 700 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 120 (e.g., the reconstruction module 420) (e.g., the processing circuits of the processor 210) may receive an image to be processed in the current iterative reconstruction. As described in connection with operation 611, for the first iterative reconstruction, the image to be processed is the initial image; for subsequent iterative reconstructions, the image to be processed is an optimized image determined in a previously adjacent iterative reconstruction.

In 720, the processing device 120 (e.g., the reconstruction module 420) (e.g., the processing circuits of the processor 210) may determine forward projection data by performing a forward projection transformation on the image to be processed in the current iteration step.

In 730, the processing device 120 (e.g., the reconstruction module 420) (e.g., the processing circuits of the processor 210) may obtain originally acquired projection data associated with the initial image from the scanning device 110 or a storage device (e.g., the storage device 150, the storage device 220, and/or the storage 390) via a network (e.g., the network 140).

In 740, the processing device 120 (e.g., the reconstruction module 420) (e.g., the processing circuits of the processor 210) may determine a weighted error between the forward projection data and originally acquired projection data associated with the initial image.

In 750, the processing device 120 (e.g., the reconstruction module 420) (e.g., the processing circuits of the processor 210) may determine back projection data by performing a back projection transformation on the weighted error.

In 760, the processing device 120 (e.g., the reconstruction module 420) (e.g., the processing circuits of the processor 210) may determine a preliminary updated image based at least in part on the back projection data. Further, the processing device 120 may determine an updated image by repeating operations 720-760 on the preliminary updated image until the preliminary updated image satisfies a preset condition. In some embodiments, the preset condition may include a certain count of iterations that have been performed, the preliminary updated image has reached a desired image quality (e.g., a noise rate is less than a threshold), etc. The certain count of repetitions may be default settings of the medical system 100 or may be adjustable under different situations.

In 770, the processing device 120 (e.g., the reconstruction module 420) (e.g., the processing circuits of the processor 210) may determine a quality feature of the updated image.

In 780, the processing device 120 (e.g., the reconstruction module 420) (e.g., the processing circuits of the processor 210) may input the updated image and the quality feature into an optimizing model.

In 790, the processing device 120 (e.g., the reconstruction module 420) (e.g., the processing circuits of the processor 210) may determine an optimized image based on an output of the optimizing model, e.g., designating the output of the optimizing model as the optimized image. In some embodiments, the processing device 120 may determine whether a termination condition is satisfied in the current iteration step. If it is determined that the termination condition is satisfied in the current iteration step, the processing device 120 may designate the optimized image in the current iteration step as the reconstructed image. If it is determined that the termination condition is not satisfied in the current iteration step, the processing device 120 may designate the optimized image as a next image to be processed in a next iteration step and execute operations 720-790 iteratively until the termination condition is satisfied.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added and/or omitted in the process 700. For example, operation 770 may be omitted in the process 700, and the processing device 120 may input the updated image into the optimizing model to determine the optimized image.

Figure 8:
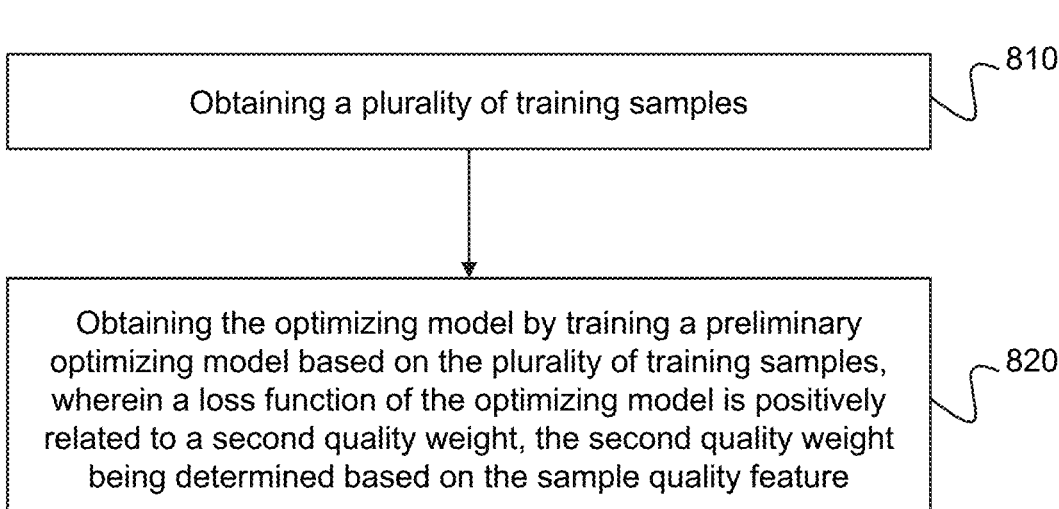
FIG. 8 is a flowchart illustrating an exemplary process for determining an optimizing model applicable in a specific iteration step according to some embodiment of the present disclosure.

FIG. 8 is a flowchart illustrating an exemplary process for determining an optimizing model applicable in a specific iteration step according to some embodiment of the present disclosure. In some embodiments, process 800 may be executed by the medical system 100. For example, the process 800 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 800. Alternatively, the process 800 may be performed by a computing device of a system of a vendor that provides and/or maintains such an optimizing model. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting. For illustration purposes, the following description is descried with reference to determiening an optimizing model with an optimizing goal of reduing interference information of an image.

In 810, the processing device 120 (e.g., the training module 430) (e.g., the processing circuits of the processor 210) may obtain a plurality of training samples. In some embodiments, at least one of the plurality of training samples may be previously generated and stored in a storage device (e.g., the storage device 150, the storage 220, the storage 390, or an external database). The processing device 120 may retrieve the training samples directly from the storage device.

In some embodiments, each of the plurality of training samples may include a sample image and a gold standard image corresponding to the sample image. As used herein, a gold standard image refers to an image that is deemed interference-free (also referred to as a ground truth image). For example, the gold standard image may have no detectable interference information according to a standard (e.g., determined by a computing device according to an interference detection algorithm or a noise and/or artifact recognition algorithm or by an observer). As another example, the gold standard image may have interference information that is less than a threshold interference. As another example, the gold standard image may be a reconstructed image that is determined using a traditional iterative algorithm (e.g., an iterative algorithm including a fidelity term and/or a regularization item) and/or an existing optimizing model. For example, a preliminary reconstructed image may be reconstructed based on projection data acquired under a relatively high radiation dose using the traditional iterative algorithm. The reconstructed image may be determined based on the existing optimizing model and the preliminary reconstructed image. As used herein, a sample image refers to an image relating to a same subject (e.g., the heart of a patient) and the sample image has more interference information than the gold standard image.

In some embodiments, each of the plurality of training samples may include the gold standard image, the sample image, and a sample quality feature of the sample image. As described in connection with operation 621, the sample quality feature may include a sample noise feature, a sample artifact feature, a sample gray distribution, a sample global gray scale, a sample resolution, a sample contrast of the sample image, or the like, or any combination thereof. The sample noise feature may include a sample noise distribution, a sample noise intensity, a sample global noise intensity, a sample noise rate, or the like, or any combination thereof. The sample artifact feature may include a sample artifact distribution, a sample artifact intensity, a sample global artifact intensity, a sample artifact rate, or the like, or any combination thereof.

In some embodiments, the plurality of training samples may correspond to various quality levels (e.g., various noise intensities, various artifact intensities). In some embodiments, the plurality of training samples may be previously generated and stored in a storage device (e.g., the storage device 150, the storage 220, the storage 390, or an external database) disclosed elsewhere in the present disclosure. The processing device 120 may retrieve the plurality of training samples directly from the storage device. In some embodiments, at least a portion of the plurality of training samples may be generated by the processing device 120. For instance, the processing device 120 may obtain at least one qualified image (e.g., an image with its quality feature satisfying a quality requirement such as a gold standard image) and generate a plurality of sample images based on the at least one qualified image.

For example, the processing device 120 may generate the plurality of sample images by preprocessing (e.g., performing a segmentation, a noise addition, an artifact addition) the at least one qualified image. Take a specific qualified image as an example, the processing device 120 may segment the qualified image into a plurality of sub-images using an image segmentation algorithm. Exemplary image segmentation algorithms may include a threshold-based segmentation algorithm, an edge-based segmentation algorithm, a region-based segmentation algorithm, a clustering-based algorithm, an image segmentation algorithm based on wavelet transform, an image segmentation algorithm based on mathematical morphology, an image segmentation algorithm based on artificial neural network, or the like, or any combination thereof. As another example, the processing device 120 may add different interference information (e.g., noises and/or artifacts with different levels) into a qualified image or a sub-image to generate a plurality of sample images corresponding to the qualified image or the sub-image. In some embodiments, the processing device 120 may add noises of different types (e.g., a Gaussian noise, an impulse noise, a Rayleigh noise, an exponential distribution noise, a uniform distribution noise, a random noise) with different levels into the qualified image or the sub-image. Similarly, the processing device 120 may add artifacts of different types (e.g., a strip artifact, a ring artifact, a shadow artifact, a ribbon artifact) with different levels into different regions of the qualified image or the sub-image.

As another example, the processing device 120 may determine at least a portion of the plurality of sample images based on at least one gold standard image. For instance, the processing device 120 may obtain a reference interference component. The processing device 120 may obtain a gold standard image. The processing device 120 may determine a plurality of sample images based on the gold standard image and the reference interference component. Accordingly, a gold standard image may correspond to a plurality of sample images. As used herein, a reference interference component refers to pure interference (e.g., pure noise, pure artifact) which can be added to the gold standard image according to an interference level to generate a sample image. The larger the interference level is, the more interference information of the sample image may be. Taking the reference interference component of pure noise as an example, the processing device 120 may determine a sample image based on a gold standard image corresponding to the sample image according to formula (9) below:

$$\text{Image}_{Noise} = \text{Image}_{gold} + \alpha \times \text{Noise}, \tag{9}$$

where $\text{Image}_{Noise}$ refers to the sample image, $\text{Image}_{gold}$ refers to the gold standard image corresponding to the sample image, Noise refers to the reference interference component (e.g., a noise component), and a refers to the interference level. In some embodiments, a value of the interference level may be within a preset level range, e.g., within a range of 0-1. For example, if the interference level is equal to 0.5 (i.e., $\alpha=0.5$), the sample image may be determined by adding 50% of the reference interference component to the gold standard image. As another example, if the interference level is equal to 0.7 (i.e., α=0.7), the sample image may be determined by adding 70% of the reference interference component to the gold standard image.

Figures 12A, 12B, 13:
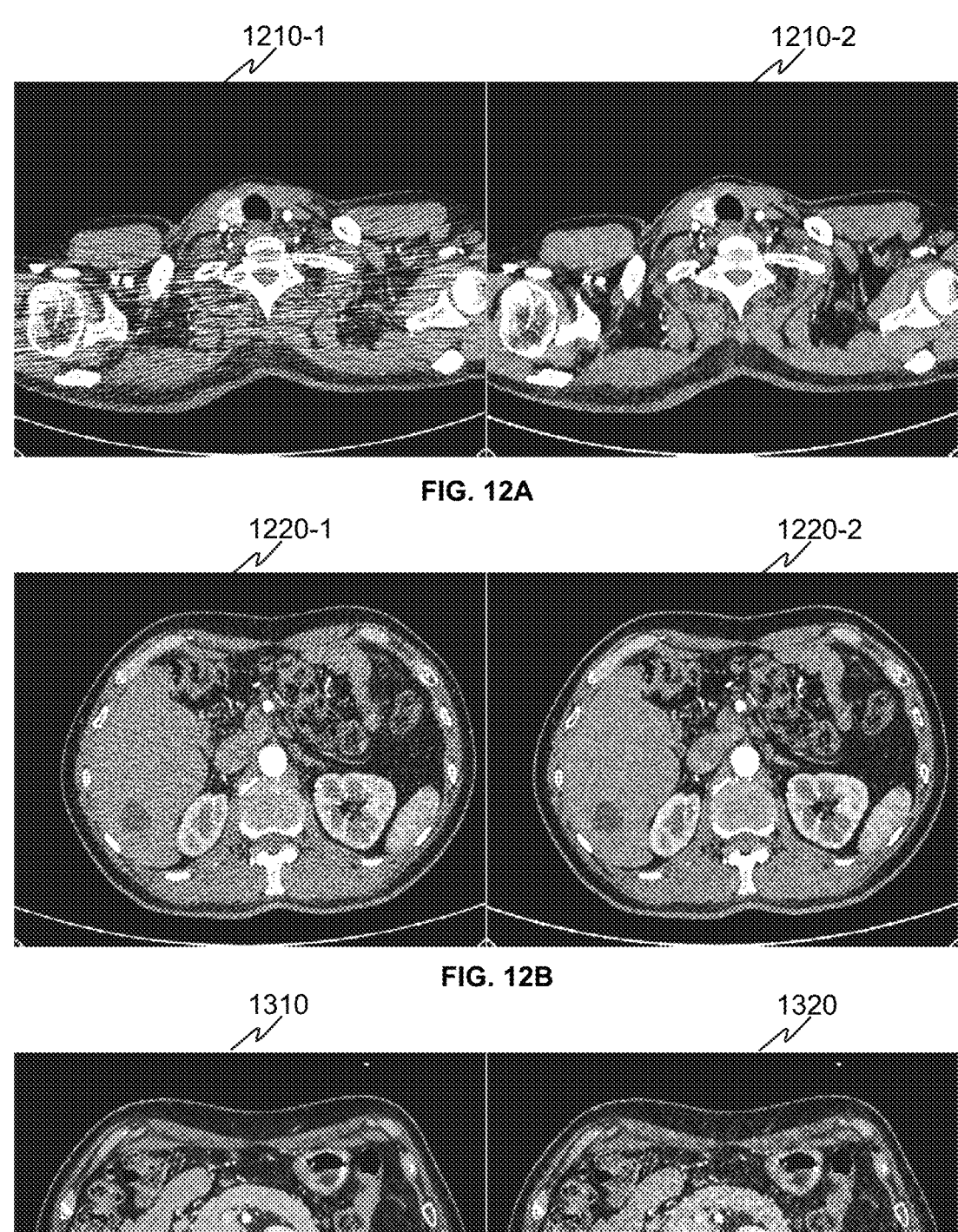
FIGS. 12A and 12B are schematic diagrams illustrating exemplary initial images and updated images corresponding to the initial images according to some embodiments in the present disclosure.
FIG. 13 is a schematic diagram illustrating exemplary images for determining a reference interference component according to some embodiments of the present disclosure.

In some embodiments, the processing device 120 may obtain a first reconstructed image (e.g., a gold standard image 1310 as shown in FIG. 13) corresponding to a first imaing dose (e.g., a normal dose, a relatively high radiation dose such as a radiation dose greater than a preset radiation dose). As used herein, an imaging dose refers to the dose of an imaging agent. For instance, for a radiation-based imaging modality, the imaging dose refers to the dose of the imaging radiation (also referred to as a radiation dose). As another example, for MRI imaging, the imaging dose refers to a magnetic field intensity (e.g., 3 T, 5 T, 7 T, etc.) corresponding to the MRI device. The higer the magnetic field internsity of an MRI device is, a higher SNR of the MRI device may be and a higher resolution of the image acquired during the imaging of the MRI device may be. The first reconstructed image may be determined based on image data acquired under the first imaging dose. The processing device image may obtain a second reconstructed image (e.g., a simulated image 1320 as shown in FIG. 13) corresponding to a second imaging dose (e.g., a relatively low radiation dose) lower than the first imaging dose. A quality of the first reconstructed image may be higher than a quality of the second reconstructed image. For example, the second reconstructed image may be determined based on image data acquired under the second imaging dose. As another example, the second reconstructed image may be determined using a simulation algorithm by simulating the second imaging dose. Further, the processing device 120 may determine the reference interference component based on the first reconstructed image and the second reconstructed image, e.g., according to formula (10) below:

$$\text{Noise} = \text{Image}_{Low} - \text{Image}_{high}, \tag{10}$$

where $\text{Image}_{Low}$ refers to the second reconstructed image, and $\text{Image}_{high}$ refers to the first reconstructed image. In such cases, the reference interference component determined based on reconstructed images corresponding to different radiation doses may be close to real interference information (e.g., including different types of interference information). In addition, by determining the sample images by adding the reference interference component to the gold standard image according to different interference levels, the optimizing model trained using the sample images may have a general applicability corresponding to different interference levels.

In 820, the processing device 120 (e.g., the training module 430) (e.g., the processing circuits of the processor 210) may obtain the optimizing model by training a preliminary optimizing model based on the plurality of training samples.

In some embodiments, the preliminary optimizing model may a machine learning model (e.g., a neural network model). As described in connection with FIG. 6, the neural network model may include an MLP model, a DNN model, a CNN model, a DCED network model, a GAN model, or the like, or any combination thereof. In some embodiments, the preliminary optimizing model may include at least one preliminary model parameter. The at least one preliminary model parameter may be a default setting of the medical system 100 or may be adjustable under different situations. Take a CNN model as an example, the at least one preliminary model parameter may include a count of convolutional layers, a count of kernels, a kernel size, a stride, a padding of each convolutional layer, or the like, or any combination thereof.

In some embodiments, the processing device 120 may train the preliminary optimizing model based on one or more gradient descent algorithms. Exemplary gradient descent algorithms may include an Adam optimization algorithm, a stochastic gradient descent (SGD)+Momentum optimization algorithm, a Nesterov accelerated gradient (NAG) algorithm, an Adaptive Gradient (Adagrad) algorithm, an Adaptive Delta (Adadelta) algorithm, a Root Mean Square Propagation (RMSprop) algorithm, an AdaMax algorithm, a Nadam (Nesterov-accelerated Adaptive Moment Estimation) algorithm, an AMSGrad (Adam+SGD) algorithm, or the like, or any combination thereof.

In some embodiments, the processing device 120 may train the preliminary optimizing model iteratively until a termination condition is satisfied. In response to that the termination condition is satisfied, the optimizing model may be finalized. In some embodiments, the termination condition may relate to a value of a loss function (also referred to as a second loss function), e.g., relating to a difference between a gold standard image and an estimated reconstructed image determined by inputting a sample image corresponding to the gold standard image to the in the specific iteration. For example, the termination condition may be satisfied if the value of the loss function is minimal or smaller than a predetermined threshold. As another example, the termination condition may be satisfied if the value of the loss function converges. In some embodiments, "convergence" may refer to that the variation of the values of the loss function in two or more consecutive iterations is equal to or smaller than a predetermined threshold. In some embodiments, "convergence" may refer to that a difference between the value of the loss function and a target value is equal to or smaller than a predetermined threshold. In some embodiments, the termination condition may be satisfied when a specified count of iterations has been performed in the training process.

In some embodiments, the loss function (i.e., the second loss function) may be positively related to a second quality weight which may be associated with a quality level of a sample image and may be determined based on the sample quality feature of the sample image. In some embodiments, the second quality weight may be positively or negatively related to the sample quality feature(s) according to different optimization targets, so as to balance effects of different samples on the training of the model. For example, for a model used for "noise reduction," the plurality of training samples may include samples with relatively high sample noise intensities and samples with relatively low sample noise intensities. During the training, the loss function may be easy to decrease by optimizing the samples with relatively high sample noise intensities. Therefore, in order to balance effects of the samples with relatively high sample noise intensities and the samples with relatively low sample noise intensities on the loss function, second quality weights corresponding to the samples with relatively high sample noise intensities may be less than second quality weights corresponding to the samples with relatively low sample noise intensities. Merely by way of example, the second quality weight may be inversely proportional to the sample noise intensity. From another point of view, the plurality of training samples may include samples with relatively high sample contrasts (e.g., sample CT images including objects with relatively high structure contrasts such as a bone, a lung) and samples with relatively low sample contrasts (e.g., sample CT images including objects with relatively low structure contrasts such as a soft tissue (e.g., a liver)). During the training, the loss function may be easy to decrease by optimizing the samples with relatively high sample contrasts. Therefore, in order to balance effects of the samples with relatively high sample contrasts and the samples with relatively low sample contrasts on the loss function, second quality weights corresponding to the samples with relatively high sample contrasts may be less than second quality weights corresponding to the samples with relatively low sample contrasts. Merely by way of example, the second quality weight may be inversely proportional to the sample contrast.

As another example, similarly, for a model used for "artifact reduction," second quality weights corresponding to samples with relatively high artifact intensities may be less than second quality weights corresponding to samples with relatively low artifact intensities. Merely by way of example, the second quality weight may be inversely proportional to the sample artifact intensity.

As a further example, for a model used for "resolution enhancement," the plurality of training samples may include samples with relatively high sample resolutions and samples with relatively low sample resolutions. During the training, the loss function may be easy to decrease by optimizing the samples with relatively low sample resolutions. Therefore, in order to balance effects of the samples with relatively high sample resolutions and the samples with relatively low sample resolutions on the loss function, second quality weights corresponding to the samples with relatively high sample resolutions may be greater than second quality weights corresponding to the samples with relatively low sample resolutions. Merely by way of example, the second quality weight may be proportional to the sample resolution.

In some embodiments, the processing device 120 may determine different optimizing models corresponding to different object types and/or different scanning device types. More descriptions regarding the training of the preliminary optimizing model may be found in, for example, International Application No. PCT/CN2020/0908062, entitled "SYSTEMS AND METHODS FOR IMAGE OPTIMIZATION," filed on May 18, 2020, the contents of which are hereby incorporated by reference.

In some embodiments, the image reconstruction described elsewhere in the present disclosure may include a plurality of iteration steps. Each of the iteration steps may include an optimizing model. Different iteration steps may include different optimizing models. For example, the optimizing models in different iteration steps may correspond to a same type of machine learning model and have a same network structure, while the optimization models in different iteration steps may correspond to different values of at least one learnable parameter. As another example, the optimization models in different iteration steps may correspond to different types of machine learning models. The plurality of optimizing models corresponding to the plurality of iteration steps may be determined according to a plurality of training process, each of which is similar to the process 800. Each of the plurality of optimizing models may be labled to indicate what specific iteration step to which the optimizing model belongs. Accordingly, the optimizing model may be obtained and used in its corresponding iteration step. In some embodiments, the plurality of optimizing models may be trained in sequence. Taking two iteration steps as an example, a first optimizing model in a first iteration step may be determined before a second optimizing model in a second iteration step. The first optimizing model may be determined based on a plurality of first training samples, and the second optimizing model may be determined based on a plurality of second training samples. The plurality of second training samples may be determined based on the plurality of first training samples and the first optimizing model. For example, for each of the first training samples, the first training sample may include a first sample image. The sample image may be input to the first optimizing model to output a first optimized image and a first gold standard image. The first optimized image may be further processed by a first operation in the second iteration step to generate a first updated image. The first updated image and the first gold image may be designated as a second sample image and a second gold standard image, respectively, of one of the plurality of second training samples. Alternatively, the plurality of optimizing models may be trained individually. Taking two iteration steps as an example, a first optimizing model in a first iteration step may be determined based on a pluraity of first training samples, and a second optimizing model in a second iteration step may be determined based on a plurality of second training samples. Each first training sample may include a first sample image and a first gold standard image. Each second training sample may include a second sample image and a second gold standard image. The first gold standard image may be the same as the second standard image, while the first sample image may be different from the second sample image.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, the processing device 120 may update the optimizing model periodically or irregularly based on one or more newly-generated training samples (e.g., new sample images, new qualified images generated in medical diagnosis). As another example, the processing device 120 may divide the plurality of training samples into a training set and a test set. The training set may be used to train the model and the test set may be used to determine whether the training process has been completed.

Figure 9:
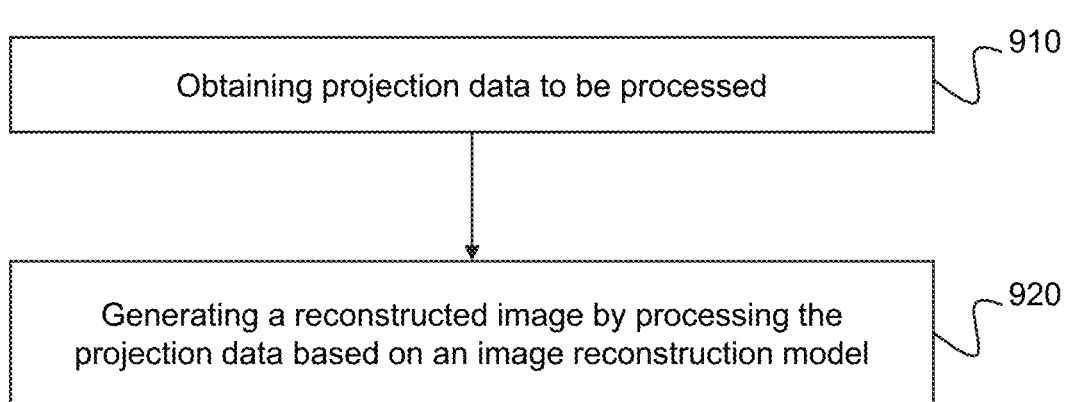
FIG. 9 is a flowchart illustrating an exemplary process for image reconstruction according to some embodiments of the present disclosure.

FIG. 9 is a flowchart illustrating an exemplary process for image reconstruction according to some embodiments of the present disclosure. In some embodiments, process 900 may be executed by the medical system 100. For example, the process 900 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, the processing device 120 (e.g., the obtaining module 410) (e.g., the interface circuits of the processor 210) may obtain projection data to be processed.

In some embodiments, the projection data to be processed may be originally acquired projection data. In some embodiments, the processing device 120 may direct the scanning device 110 to perform a scan (e.g., a CT scan) on an object (e.g., a patient) to obtain the projection data to be processed. In some embodiments, the projection data to be processed may be previously obtained and stored in a storage device (e.g., the storage device 150, the storage device 220, and/or the storage 390). The processing device 120 may obtain the projection data to be processed from the storage device via a network (e.g., the network 140).

In 920, the processing device 120 (e.g., the reconstruction module 420) (e.g., the processing circuits of the processor 210) may generate a reconstructed image by processing the projection data based on an image reconstruction model.

In some embodiments, the processing device 120 may input the projection data to be processed and/or an initial image) into the image reconstruction model. Further, the processing device 120 may designate an output of the image reconstruction model as the reconstructed image. In some embodiments, the initial image may be an image reconstructed based on the projection data according to a reconstruction algorithm (e.g., an FBP algorithm). In some embodiments, the initial image may be a defined image including pixels with defined pixel values (e.g., 0). The defined pixel values may be default settings of the medical system 100 or may be adjustable under different situations.

In some embodiments, the image reconstruction model may include a plurality of sequentially connected sub-models. Each of the plurality of sequentially connected sub-models may include a processing layer and a reconstruction layer. The processing layer may be configured to receive an image to be processed (for the first sub-model, the image to be processed is the initial image) in the sub-model and determine a regularization result by regularizing the image to be processed based on the projection data. The reconstruction layer may be configured to determine a sub-reconstructed image based on the regularization result and a previous sub-reconstructed image determined by a previously adjacent sub-model and designate the sub-reconstructed image as a next image to be processed in a next sub-model. More descriptions of the image reconstruction model may be found elsewhere in the present disclosure (e.g., FIG. 10 and the description thereof).

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted.

Figure 10:
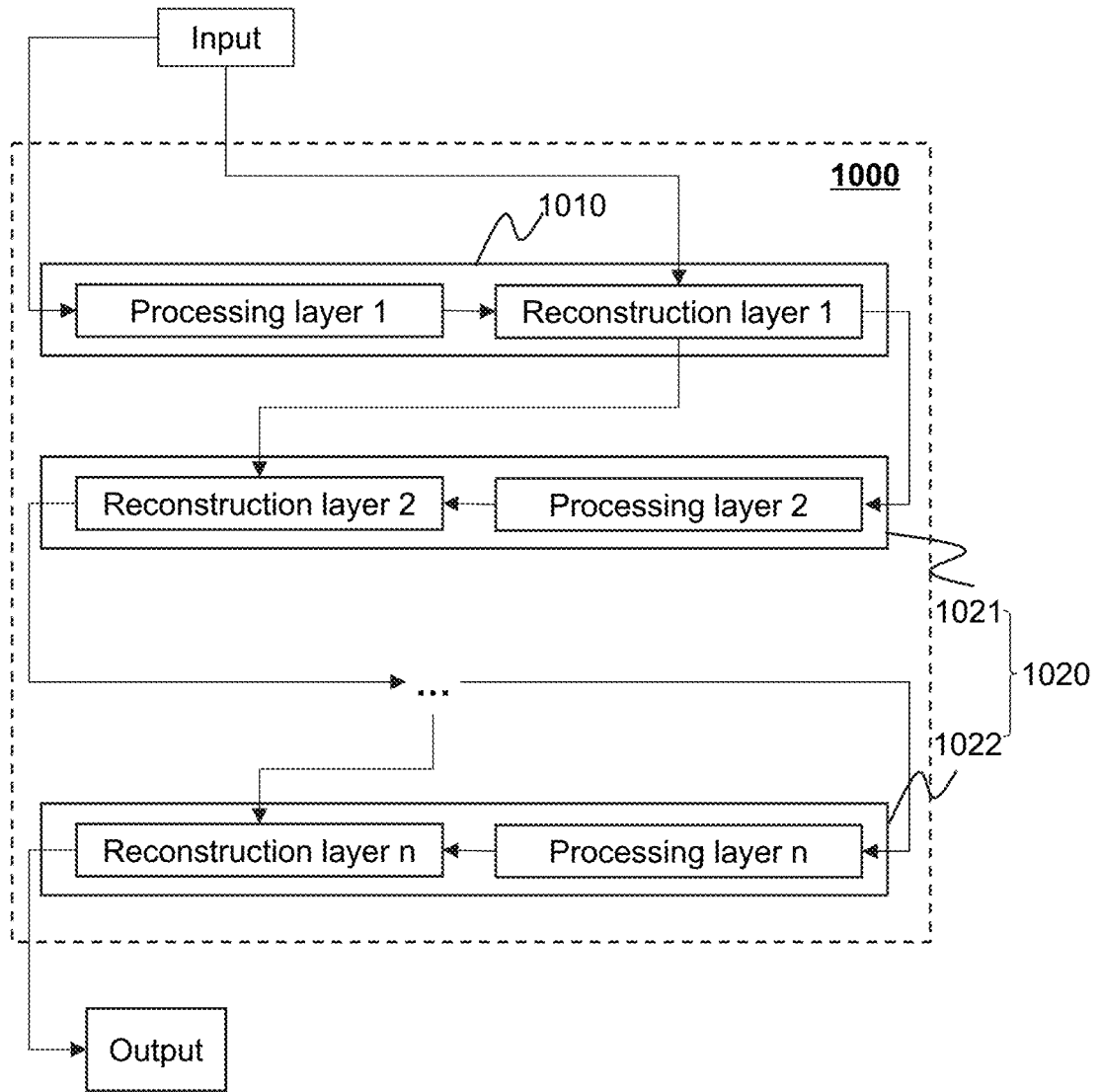
FIG. 10 is a schematic diagram illustrating an exemplary image reconstruction model according to some embodiments of the present disclosure.

FIG. 10 is a schematic diagram illustrating an exemplary image reconstruction model according to some embodiments of the present disclosure. In some embodiments, as described in connection with FIG. 5 and FIG. 6, the processing device 120 may determine a reconstructed image by performing a plurality of iteration steps on an initial image. In some embodiments, the plurality of iteration steps may be implemented via the image reconstruction model 1000. In some embodiments, as described in connection with FIG. 9, the processing device 120 may determine a reconstructed image by processing projection data based the image reconstruction model 1000. As illustrated in FIG. 10, an input of the image reconstruction model 1000 may include originally acquired projection data (i.e., the projection data to be processed illustrated in FIG. 9) and/or an initial image; an output of the image reconstruction model 1000 may include the reconstructed image.

As shown in FIG. 10, the image reconstruction model 1000 may include a plurality of sequentially connected sub-models, such as a first sub-model 1010 and one or more second sub-models 1020 (e.g., 1021 and 1022). In some embodiments, a count of the plurality of sub-models may be a default setting of the medical system 100, manually set by a user or an operator, or determined by the processing device 120 according to an actual need. In some embodiments, the first sub-model 1010 may be configured to receive the input (e.g., the originally acquired projection data and/or the initial image) of the image reconstruction model 1000 and generate an output. Each of the second sub-model 1020 may be configured to receive an output of a previously adjacent sub-model connected to the second sub-model 1020 and generate an output. The output of the image reconstruction model 1000 may be the output of the last second sub-model.

In some embodiments, each of the plurality of sub-models may include a processing layer (e.g., a processing layer 1, a processing layer 2, a processing layer n) and a reconstruction layer (e.g., a reconstruction layer 1, a reconstruction layer 2, a reconstruction layer n).

The processing layer may be configured to receive an image to be processed in the sub-model. In some embodiments, for the first sub-model 1010, the input of the processing layer (e.g., the processing layer 1) may include the input (e.g., the originally acquired projection data and/or the initial image) of the image reconstruction model 1000; for the second sub-model 1020 (e.g., 1021), the input of the processing layer (e.g., the processing layer 2) may include a sub-reconstructed image output by a reconstruction layer (e.g., the reconstruction layer 1) of a previously adjacent sub-model (e.g., the first sub-model 1010). The processing layer may be also configured to determine a regularization result by regularizing the image to be processed based on the projection data. Specifically, the processing layer may be configured to regularize the input of the processing layer and generate a regularization result (e.g., a result matrix) corresponding to the input. For example, the processing layer 1 of the first sub-model 1010 may be configured to regularize the initial image and generate a regularization result of the initial image. As another example, the processing layer 2 of the second sub-model 1021 may be configured to regularize a sub-reconstructed image output by the reconstruction layer 1 and generate a regularization result of the sub-reconstructed image. In some embodiments, the processing layer may include a neural network model. The neural network model may include an MLP model, a DNN model, a CNN model, a DCED network model, a GAN model, or the like, or any combination thereof. In some embodiments, for different sub-models, parameters of the processing layers may be different and may be obtained by training.

The reconstruction layer may be configured to determine a sub-reconstructed image based on the regularization result and a previous sub-reconstructed image determined by a previously adjacent sub-model. In some embodiments, for the first sub-model 1010, the input of the reconstruction layer (e.g., the reconstruction layer 1) may include an output (i.e., the regularization result of the initial image) of the processing layer (e.g., the processing layer 1) of the first sub-model 1010 and the input (e.g., the projection data) of the image reconstruction model 1000; for the second sub-model 1020 (e.g., 1021), the input of the reconstruction layer (e.g., the reconstruction layer 2) may include an output (i.e., the regularization result of the sub-reconstructed image) of a processing layer (e.g., the processing layer 2) of the second sub-model 1020 (e.g., 1021) and a sub-reconstructed image output by a reconstruction layer (e.g., the reconstruction layer 1) in a previously adjacent sub-model (e.g., the first sub-model 1010). The reconstruction layer may be also configured to designate the sub-reconstructed image as a next image to be processed in a next sub-model. As illustrated, the output of the reconstruction layer of each of the plurality of sub-models may include a sub-reconstructed image corresponding to the sub-model. Accordingly, the output of the last reconstruction layer (e.g., the reconstruction layer n) of the last second sub-model (e.g., 1022) may be the reconstructed image.

In some embodiments, the reconstruction layer of each sub-model may be configured to determine a sub-reconstructed image based on the input of the reconstruction layer by using a Newton's algorithm according to formula (11) below:

$$U_m = U_{m-1} - \alpha \frac{A^T(AU_{m-1} - f)_w + \dfrac{\partial N_m(U_{m-1}, \theta_m)}{\partial U_{k-1}}}{A^T(A\mathbb{1})_w + \dfrac{\partial^2 N_m(U_{m-1}, \theta_m)}{(\partial U_{m-1})^2}}, \tag{11}$$

where $U_m$ refers to a sub-reconstructed image (also referred to as an mth sub-reconstructed image) output by a reconstruction layer of an mth sub-model, $U_{m-1}$ refers to a sub-reconstructed image (also referred to as an (m−1)th sub-reconstructed image) output by a reconstruction layer of an (m−1)th sub-model, A refers to a forward projection matrix, $A^T$ refers to a back projection matrix, $A\mathbb{1}$ refers to an operation for performing a forward projection transformation on an image with all pixel values of 1, f refers to the originally acquired projection data, $AU_{m-1}$ refers to forward projection data of the (m−1)th sub-reconstructed image, $\alpha$ refers to an iteration step length, $$\frac{\partial N_m(U_{m-1}, \theta_m)}{\partial U_{k-1}}$$

refers to a regularization result output by a processing layer of the mth sub-model, and w refers to a first quality weight or the second quality weight. More descriptions regarding the quality feature may be found elsewhere in the present disclosure (e.g., operation 610 in FIG. 6 and relevant description thereof).

In some embodiments, parameters of each sub-model in the image reconstruction model 1000 may be obtained by end-to-end training. In some embodiments, the processing device 120 may train the reconstruction model 1000 based on a plurality of training samples with labels. Specifically, the processing device 120 may input the plurality of training samples into a preliminary image reconstruction model and update the parameters of the preliminary image reconstruction model based on the plurality of labeled training samples to obtain the image reconstruction model 1000. In some embodiments, a training sample may include sample projection data and a sample initial image, and a label of the training sample may be a qualified reconstructed image corresponding to the sample initial image. More descriptions regarding model training may be found elsewhere in the present disclosure (e.g., FIG. 8 and the description thereof).

In the above embodiments, a regularization result obtained in a processing layer may be regarded as a regularization term, which is generated based on an image output of a previous layer by the machine learning model. Compared with a fixed regularization term or a regularization term generated by a formula, the above embodiments described in the present disclosure have greater flexibility and adaptability and can achieve a better reconstruction effect (e.g., generate a reconstructed image with improved image quality and reduced noise).

It should be noted that the above description regarding the image reconstruction model 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the image reconstruction model 1000 may include one or more additional components or one or more components described above may be omitted.

FIGS. 12A and 12B are schematic diagrams illustrating exemplary initial images and updated images corresponding to the initial images according to some embodiments in the present disclosure. As shown in FIGS. 12A and 12B, an initial image 1210-1 and an updated image 1210-2 are related to a shoulder part of a patient. An initial image 1220-1 and an updated image 1220-2 are related to an abdomen part of a patient. The initial image 1210-1 and the initial image 1220-1 were reconstructed using an FBP algorithm. The updated images 1210-2 and 1210-2 were determined by performing a first optimization operation on the initial images 1210-1 and 1220-1 respectively, e.g., according to operations 611 and 612.

Figure 14:
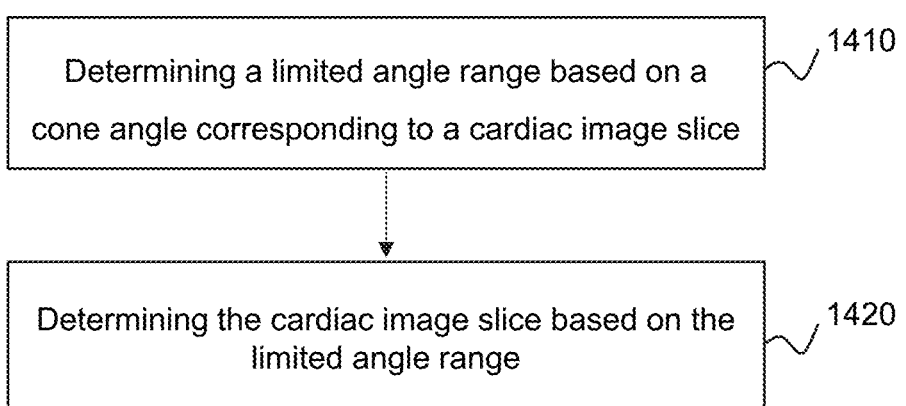
FIG. 14 is a flowchart illustrating an exemplary process for determining a cardiac image slice corresponding to a cone angle according to some embodiments of the present disclosure.

FIG. 14 is a flowchart illustrating an exemplary process for determining a cardiac image slice corresponding to a cone angle according to some embodiments of the present disclosure. In some embodiments, process 1400 may be executed by the medical system 100. For example, the process 1400 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 1400. The operations of the illustrated process presented below are intended to be illustrative. In some embodiments, the process 1400 may be accomplished with one or more additional operations not described and/or without one or more of the operations discussed. Additionally, the order of the operations of process 1400 illustrated in FIG. 14 and described below is not intended to be limiting.

As described in FIGS. 1 and 5, in the context of image reconstruction of the heart, the heart may be scanned in a preset scanning angle range for acquiring multiple sets of scanning data. Each of the multiple sets of scanning data may correspond to one of multiple cardiac image slices of a cardiac image. Traditionally, in order to improve a time resolution of the cardiac image each of the multiple cardiac image slices may be reconstructed based on scanning data acquired under a same limited angle range (also referred to as a preset limited angle range) within the preset scanning angle range, which may result in the issues of insufficient scanning data, especially for a cardiac image slice corresponding to a relatively large cone angle (e.g., a cardiac image slice reconstructed based on scanning data that is acquired by at least one detector row corresponding to the relatively large cone angle), and poor image quality. Therefore, the process 1400 may be provided for solving the issues of insufficient data caused by using the same limited angle range for each of the multiple cardiac image slices, and thereby improving the image quality of the cardiac image.

In 1410, the processing device 120 (e.g., the obtaining module 410) may determine a limited angle range based on the cone angle corresponding to the cardiac image slice.

In some embodiments, as described in connection with operation 510, the processing device 120 may determine a target angle corresponding to a target phase of the heart. The processing device 120 may determine a cone angle corresponding to the cardiac image slice. As described in connection with FIG. 1, the cone angle corresponding to the cardiac image slice may refer to a cone angle corresponding to one or more detector rows that acquire a set of scanning data (e.g., in the preset scanning angle range) based on which the cardiac image slice is generated. The processing device 120 may determine the limited angle range within the preset scanning angle range corresponding to the cardiac image slice based on the cone angle corresponding to the cardiac image slice and the target angle. The limited angle range may be centered at the target angle. In some embodiments, the cone angle corresponding to the cardiac image slice may correspond to a specific location related to the one or more detector rows that acquire the image data used to generate the initial cardiac image. For instance, the specific location may include a location (e.g., a z-axis coordinate) of one of the one or more detector rows (e.g., that is closest to the end of the detector), or an average of location(s) of the one or more detector rows in the detector. Accordingly, the processing device 120 may determine the limited angle range corresponding to the cardiac image slice based on the specific location related to the one or more detector rows. For instance, during image reconstruction, for a detector row of a large cone angle, the processing device 120 may assign a large limited angle range to compensate the amount of image data acquired by the detector row, while for a detector row of a small cone angle, the processing device 120 may assign a small limited angle range to achieve a high time resolution.

Figure 15:
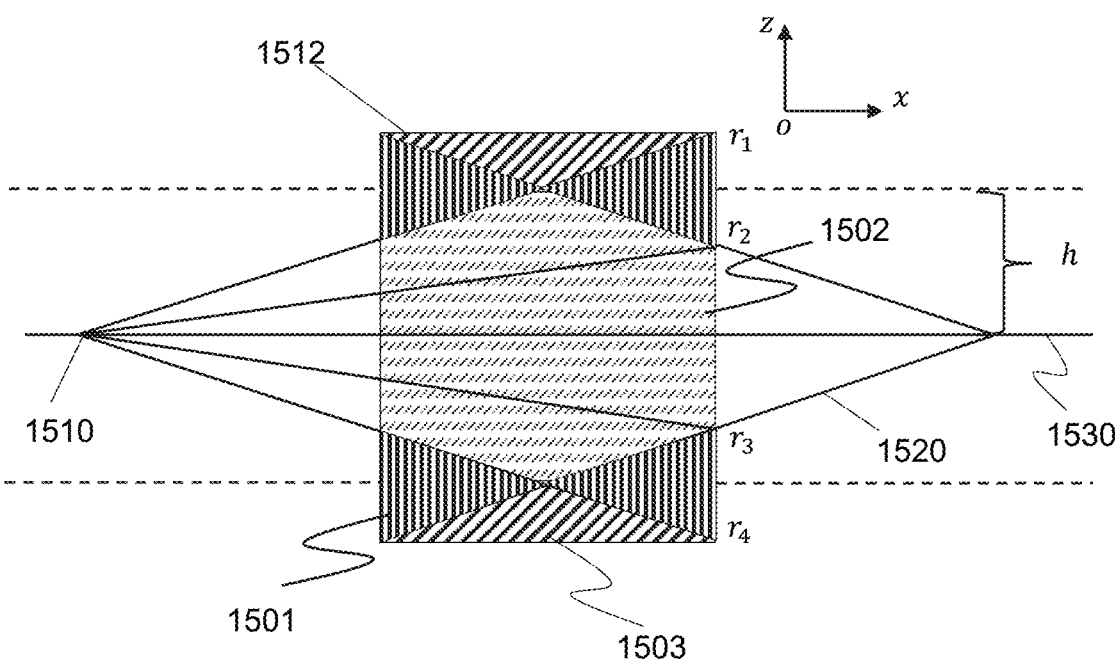
FIG. 15 is a schematic diagram illustrating exemplary locations of multiple detector rows of a detector according to some embodiments of the present disclosure.

FIG. 15 is a schematic diagram illustrating exemplary locations of multiple detector rows of a detector according to some embodiments of the present disclosure. The multiple detector rows of the detector 1512 (e.g., the detector 112 or 1120) may be arranged along the z-axis. A location of each of the multiple detector rows in the detector 1512 may be represented by a z-axis coordinate. As shown in FIG. 15, h denotes a half collimation corresponding to the detector 1512; a point 1510 refers to a lateral projection of a radiation source (e.g., the radiation source 115 or S) on a horizontal plane (e.g., parallel to the x-z plane); and lines 1520 illustrate radiation rays emitted by the radiation source. The radiation source may generate a cone beam including the radiation rays. Radiation rays at a central plane (e.g., the x-y plane) perpendicular to the z-axis of the cone beam may be projected on the horizontal plane (e.g., the x-z plane) to generate a projection line segment, and h (i.e., the half collimation corresponding to the detector 1512) may indicate a half width of the projection line segment.

The processing device 120 may divide the detector 1512 into multiple regions based on h. A detector row with a z-axis coordinate of $r_1$ or $r_4$ may refer to a detector row that corresponds to a largest cone angle among the multiple detector rows in the detector 1512. A detector row with a z-axis coordinate between $r_2$ and $r_3$ (including $r_2$ and $r_3$) may refer to a detector row that is relatively close to a center 1530 of the detector 1512 and corresponds to a relatively small cone angle (e.g., smaller than a preset cone angle). Accordingly, the detector 1512 may include four first regions 1501, a second region 1502, and two third regions 1503. A first region 1501 may be a region whose z-axis coordinate is between $r_1$ and $r_2$ or between $r_3$ and $r_4$, and also be referred to as data insufficient regions (i.e., scanning data acquired by detection units in the first regions 1501 may be insufficient). A second region 1502 may be a region whose z-axis coordinate is between $r_2$ and $r_3$, which may also be referred to as data sufficient region (i.e., scanning data acquired by detection units in the second region 1502 may be sufficient). A third region 1503 may refer to a region in which detection units acquire no scanning data. Accordingly, when scanning data acquired by detection units or detector rows at different regions is used for image reconstruction, the limited angle ranges may need to be different for improving the image quality of the reconstructed image. In some embodiments, the first region 1501 may correspond to a limited angle range larger than the preset limited angle range for increasing a count (or number) of selected acquisition angles and use scanning data acquired at the selected acquisition angles for image reconstruction. The second region 1502 may correspond to the preset limited angle range and use scanning data acquired by acquisition angles corresponding to the preset limited angle range for image reconstruction. The preset limited angle range may be a default setting of the medical system 100 or may be adjustable in different situations. Exemplary widths of the preset scanning angle range within the preset scanning angle range of 360° may include 180°, 240°, etc.

In some embodiments, the preset scanning angle range may correspond to multiple acquisition angles. The set of scanning data corresponding to the cone angle may be acquired at the multiple acquisition angles under the preset sanning angle range by one or more detector rows corresponding to the cone angle. The limited angle range may include one or more acquisition angles centered at the target angle whose value is within the range of the multiple acquisition angles. Each of the multiple acquisition angles may correspond to a weight parameter which indicates a participation degree of scanning data acquired at the acquisition angle for reconstructing the cardiac image slice. As used herein, a participation degree of scanning data refers to how much information included in the scanning data can be used for image reconstruction. The more the information included in the scanning data can be used for image reconstruction is, the higher the participation degree of the scanning data may be. The greater the weight parameter corresponding to an acquisition angle is, the greater the participation degree of scanning data acquired under the acquisition angle may be. A range of the weight parameter may be [0, 1]. The target angle may correspond to a greatest weight parameter (e.g., 1) among the multiple acquisition angles. The closer an acquisition angle is to the target angle, the greater the weight parameter corresponding to the acquisition angle may be.

Figure 16:
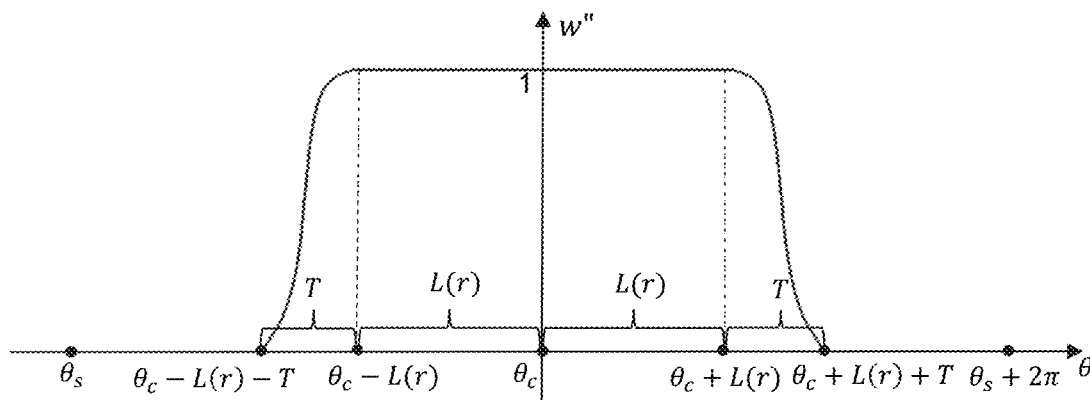
FIG. 16 is a schematic diagram illustrating exemplary weight parameters corresponding to different acquisition angles for a certain cone angle according to some embodiments of the present disclosure.

FIG. 16 is a schematic diagram illustrating exemplary weight parameters corresponding to different acquisition angles for a certain cone angle according to some embodiments of the present disclosure. One or more detector rows corresponding to the certain cone angle may acquire scanning data under multiple acquisition angles of a preset scanning angle range during a scan. As shown in FIG. 16, w" refers to weight parameter, $\theta_c$ denotes a center angle (i.e., a target angle) of the multiple acquisition angles, $\theta_s$ denotes a start acquisition angle of the multiple acquisition angles, and $(\theta_s+2\pi)$ denotes an end acquisition angle of the multiple acquisition angles, L(r) denotes half of a limited angle range corresponding to the certain cone angle (i.e., the limited angle range equals to 2 L(r)), and T denotes a width of a transition section outside the limited angle range. Weight parameters of scanning data acquired under the limited angle range (e.g., from acquisition angle $(\theta_c-L(r))$ to acquisition angle $(\theta_c+L(r))$ may be equal to a preset weight parameter (e.g., the greatest weight parameter such as 1). The preset weight parameter may be a default setting of the medical system 100 or may be adjustable in different situations. Weight parameters of scanning data acquired under the transition section may be less than the preset weight parameter and monotonously vary with the acquisition angle within the transition section. In some embodiments, for different detector rows (e.g., with different z-axis coordinates or corresponding to different cone angles), values of L(r) corresponding to the different detector rows (or the different cone angles) may be different. Detector rows in the first region may correspond to larger L(r) than detector rows in the second region. For a specific detector row with a z-axis coordinate of r, the closer the value of r is to a value of $r_1$ or $r_4$, the larger a cone angle corresponding to the specific detector row may be, the more severe the issue of insufficient scanning data of the specific detector row may be, and thereby the larger L(r) corresponding to the specific detector row may need to be for increasing the amount of scanning data which may be assigned with the preset weight parameter. The closer the value of r is to the value of $r_2$ or $r_3$, the smaller the cone angle corresponding to the specific detector row may be, the less the problem of insufficient scanning data of the specific detector row may be, and accordingly, there is less need to increase the amount of scanning data which may be assigned with the preset weight parameter.

In some embodiments, the processing device 120 may determine the half of the limited angle range (i.e., L(r)) corresponding to a certain cone angle according to formula (12) below:

$$L(r) = \begin{cases} L_0 + \left(\dfrac{\theta_l}{2} - L_0 - T\right) * \left(\dfrac{r-r_2}{r_1-r_2}\right)^n & r \in [r_1, r_2) \\ L_0 & r \in [r_2, r_3] \\ L_0 + \left(\dfrac{\theta_l}{2} - L_0 - T\right) * \left(\dfrac{r-r_3}{r_4-r_3}\right)^n & r \in (r_3, r_4] \end{cases} \quad (12)$$

where L(r) refers to the half of the limited angle range, $L_0$ refers to the half of the preset limited angle range, $\theta_l$ refers to an upper limit of a limited angle range corresponding to a detector row on the end of a detector (e.g., the detector row with the z-axis coordinate of $r_1$ or $r_4$), r refers to a z-axis coordinate corresponding to the certain cone angle, and n refers to a preset parameter which may be adjustable in different situations. In some embodiments, $\theta_l$ may be a preset value, e.g., $\theta_l=2\pi$, which can be used to control a size of the limited angle range corresponding to a relatively large cone angle. According to formula (12), when r is between $r_2$ and $r_3$, one or more detector rows corresponding to the certain cone angle may be in the second region, scanning data acquired by the one or more detector rows may be sufficient and the limited angle range may be equal to the preset limited angle range; when r is between $r_1$ and $r_2$ or between $r_3$ and $r_4$, the one or more detector rows corresponding to the certain cone angle may be in the first region, scanning data acquired by the one or more detector rows may be insufficient, and the limited angle range may need to be increased to larger than the preset limited angle range such that more scanning data may participate in (or used for) image reconstruction.

In 1420, the processing device 120 (e.g., the reconstruction module 420) may determine the cardiac image slice based on the limited angle range.

In some embodiments, the processing device 120 may obtain the set of scanning data acquired by the one or more detector rows corresponding to the cone angle. As described in operation 1410, the set of scanning data may correspond to the multiple acquisition angles of the preset scanning angle range. For each of the multiple acquisition angles, the processing device 120 may determine a weight parameter corresponding to the acquisition angle that indicates a participation degree of scanning data acquired at the acquisition angle for determining the cardiac image slice. For example, the processing device 120 may determine an angle interval to which the acquisition angle belongs based on a difference between the acquisition angle and the target angle. The angle interval may include a first angle interval indicating that an acquisition angle is within the limited angle range (e.g., the difference being smaller than or equal to L(r)), a second angle interval indicating that an acquisition angle is within the transition section (e.g., the difference being greater than L(r)) and smaller than (L(r)+T), and a third angle interval indicating that an acquisition angle is out of both the limited angle range and the transition section (e.g., the difference being greater than or equal to (L(r)+T)). The processing device 120 may determine the weight parameter corresponding to the acquisition angle based on the angle interval according to formula (13) below:

$$w_{cone}(r, \theta) = \begin{cases} 0 & |\theta - \theta_c| \geq L(r) + T \\ \cos^k\left(\dfrac{|\theta - \theta_c| - L(r)}{T} * \dfrac{\pi}{2}\right) & L(r) < |\theta - \theta_c| < L(r) + T, \\ 1 & |\theta - \theta_c| \leq L(r) \end{cases} \quad (14)$$

where $w_{cone}(r, \theta)$ refers to the weight parameter corresponding to the acquisition angle corresponding to the cone angle, $\theta$ refers to the value of the acquisition angle, and k refers to a parameter for adjusting the transition section corresponding to the cone angle. In some embodiments, k indicates a steepness degree of the transition section shown in FIG. 16, and k may be a preset value (e.g., 0, 2, 5, etc.). According to formula (13), when the acquisition angle belongs to the first angle interval (i.e., $|\theta-\theta_c|\leq L(r)$), the weight parameter may correspond to a relatively great weight parameter (e.g., the greatest weight parameter such as 1); when the acquisition angle belongs to the third angle interval (i.e., $|\theta-\theta_c|\geq L(r)+T$), the weight parameter may correspond to a relatively small weight parameter (e.g., a smallest weight parameter such as 0); when the acquisition angle belongs to the second angle interval (i.e., $L(r)<|\theta-\theta_c|<L(r)+T$), the weight parameter may between the relatively great weight parameter and the relatively small weight parameter (e.g., (0, 1)). Further, the processing device 120 may generate the cardiac image slice by reconstructing, based on weight parameters corresponding to the multiple acquisition angles, the set of scanning data corresponding to the cone angle (e.g., using an FBP algorithm).

It should be noted that the above description regarding the process 1400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 1400 may be accomplished with one or more additional operations not described and/or without one or more of the operations discussed above. In some embodiments, after the limited angle range corresponding to the certain cone angle is determined, the processing device 120 may generate the cardiac image slice by directly reconstructing scanning data acquired under the limited angle range.

Figure 17:
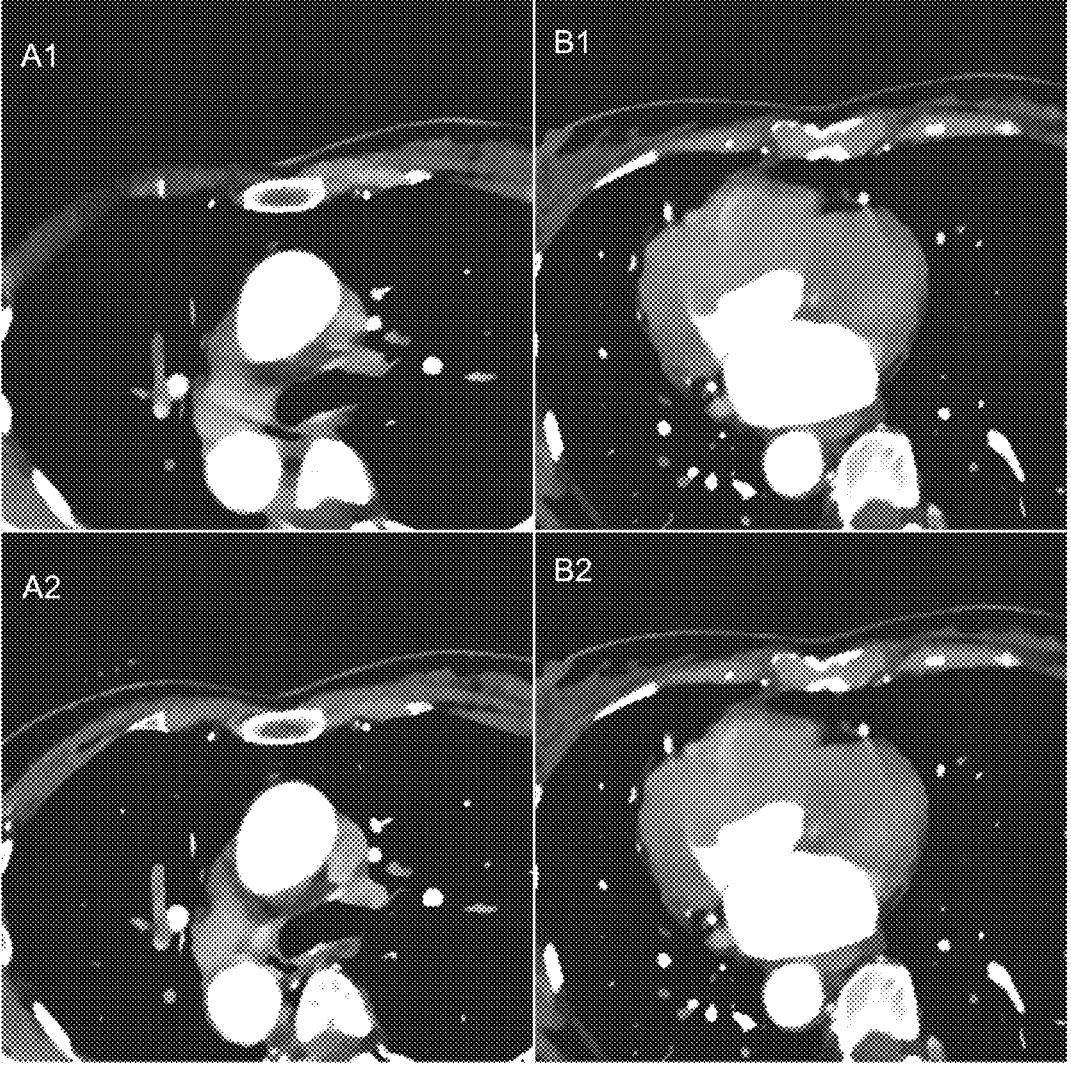
FIG. 17 is a schematic diagram illustrating exemplary reconstructed images according to some embodiments of the present disclosure.

FIG. 17 is a schematic diagram illustrating exemplary reconstructed images according to some embodiments of the present disclosure. As shown in FIG. 17, image slice A1 corresponding to a first cone angle (e.g., a relatively large cone angle) was reconstructed based on a traditional iterative algorithm (e.g., using scanning data acquired under a preset limited angle range by at least one first detector row corresponding to the first cone angle). Image slice B1 corresponding to a second cone angle (e.g., a relatively small cone angle) was reconstructed based on the traditional iterative algorithm (e.g., using scanning data acquired under the preset limited angle range by at least one second detector row corresponding to the second cone angle). The second cone angle was smaller than the first cone angle. Image slice A2 corresponding to the first cone angle was reconstructed using a reconstruction process (e.g., the process 1400) provided in the present disclosure (e.g., using scanning data acquired under a limited ange range larger than the preset limited angle range by the at least one first detector row). Image slice B2 corresponding to the second cone angle was reconstructed using the reconstruction process provided in the present disclosure (e.g., still using scanning data acquired under the preset limited angle range by the at least one second detector row). Accordingly, by adjusting the limited angle range based on a cone angle, the improvement in the image quality of reconstructed image slices for relatively large cone angles may be more than for relatively small cone angles.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image reconstruction, which is implemented on a computing device including at least one processor and a computer-readable storage device, the method comprising:
obtaining an initial image to be processed; and
generating a reconstructed image by performing a plurality of iteration steps on the initial image, one of the plurality of iteration steps including a first optimization operation and a second optimization operation, wherein the first optimization operation includes:
receiving an image to be processed in the iteration step, wherein the image to be processed in the iteration step includes the initial image, or an output of an optimizing model in a previously adjacent iteration step; and
determining an updated image by preliminarily optimizing the image to be processed, wherein the first optimization operation includes an iterative operation, the determining an updated image by preliminarily optimizing the image to be processed includes:
determining the updated image by optimizing, according to a first loss function, the image to be processed according to the iterative operation until a value of the first loss function satisfies a termination condition;
the second optimization operation includes:
determining, using the optimizing model, an optimized image based on the updated image; and
designating the optimized image as a next image to be processed in a next iteration step or designating the optimized image as the reconstructed image.

2. The method of claim 1, wherein the preliminarily optimizing the image to be processed includes:
optimizing the image to be processed according to the first loss function relating to a difference between forward projection data associated with the image to be processed and originally acquired projection data associated with the initial image.

3. The method of claim 2, wherein the first loss function relates to at least one of a first quality weight associated with a quality of the originally acquired projection data or a second quality weight associated with a quality of the image to be processed.

4. The method of claim 3, wherein the originally acquired projection data is acquired by at least one detector row of a radiation imaging device, and the first loss function relates to a third weight associated with a cone angle corresponding to the at least one detector row.

5. The method of claim 2, wherein the first loss function includes at least one of a classical regularization term or a machine learning regularization term that involves a machine learning model.

6. The method of claim 5, wherein a first ratio of the classical regularization term to the machine learning regularization term in a first iteration step is different from a second ratio of the classical regularization term to the machine learning regularization term in a second iteration step.

7. The method of claim 1, wherein the determining, using an optimizing model, an optimized image based on the updated image includes at least one of:
reducing noise information of the updated image using the optimizing model,
reducing artifact information of the updated image using the optimizing model,
improving a gray distribution of the updated image using the optimizing model,
improving a global gray scale of the updated image using the optimizing model,
improving a resolution of the updated image using the optimizing model,
improving the contrast of the updated image using the optimizing model, or
enhancing the updated image using the optimizing model.

8. The method of claim 1, further comprising:
determining, using at least one optimizing model, the optimized image based on the updated image each of the at least one optimizing model corresponding to one of different optimizing goals.

9. The method of claim 8, wherein the at least one optimizing model is applied in series or in parallel to optimize the updated image.

10. The method of claim 1, further including:

determining a quality feature of the updated image, wherein the determining, using an optimizing model, an optimized image based on the updated image further includes inputting the quality feature and the updated image into the optimizing model.

11. The method of claim 10, wherein the quality feature includes at least one of a noise feature, an artifact feature, a gray distribution, a global gray scale, a resolution, or a contrast of the updated image.

12. The method of claim 1, wherein the optimizing model is obtained by a training process including:

obtaining a plurality of training samples, each of the plurality of training samples including a gold standard image and a sample image, wherein the sample image is determined based on the gold standard image, and the gold standard image refers to an image without interference information or an image with interference information less than a threshold; and obtaining the optimizing model by training a preliminary optimizing model based on the plurality of training samples.

13. The method of claim 12, wherein the obtaining a plurality of training samples includes:

obtaining a reference interference component;

obtaining a gold standard image; and for each of the plurality of training samples, determining a sample image of the training sample by adding, according to an interference level, the reference interference component to the gold standard image.

14. The method of claim 13, wherein the obtaining a reference interference component includes:

obtaining the gold standard image corresponding to a first imaging dose;

obtaining a second reconstructed image corresponding to a second imaging dose lower than the first imaging dose; and determining the reference interference component based on the gold standard image and the second reconstructed image.

15. The method of claim 1, wherein the designating the optimized image as a next image to be processed in a next iteration step or designating the optimized image as the reconstructed image includes:

determining whether the optimized image satisfies the termination condition in the iteration step;

in response to determining that the optimized image satisfies the termination condition, designating the optimized image as the reconstructed image; and in response to determining that the optimized image does not satisfy the termination condition, designating the optimized image as the next image to be processed in the next iteration step.

16. A system for image reconstruction, comprising:

at least one storage device including a set of instructions; and at least one processor configured to communicate with the at least one storage device, wherein when executing the set of instructions, the at least one processor is configured to direct the system to perform operations including:

obtaining an initial image to be processed; and generating a reconstructed image by performing a plurality of iteration steps on the initial image, one of the plurality of iteration steps including a first optimization operation and a second optimization operation, wherein the first optimization operation includes:

receiving an image to be processed in the iteration step, wherein the image to be processed in the iteration step includes the initial image, or an output of an optimizing model in a previously adjacent iteration step; and determining an updated image by preliminarily optimizing the image to be processed, wherein the first optimization operation includes an iterative operation, the determining an updated image by preliminarily optimizing the image to be processed includes:

determining the updated image by optimizing, according to a first loss function, the image to be processed according to the iterative operation until a value of the first loss function satisfies a termination condition;

the second optimization operation includes:

determining, using an optimizing model, an optimized image based on the updated image; and designating the optimized image as a next image to be processed in a next iteration step or designating the optimized image as the reconstructed image.

17. A non-transitory computer readable medium, comprising executable instructions that, when executed by at least one processor, direct the at least one processor to perform a method, the method comprising:

obtaining an initial image to be processed; and generating a reconstructed image by performing a plurality of iteration steps on the initial image, one of the plurality of iteration steps including a first optimization operation and a second optimization operation, wherein the first optimization operation includes:

receiving an image to be processed in the iteration step, wherein the image to be processed in the iteration step includes the initial image, or an output of an optimizing model in a previously adjacent iteration step; and determining an updated image by preliminarily optimizing the image to be processed, wherein the first optimization operation includes an iterative operation, the determining an updated image by preliminarily optimizing the image to be processed includes:

determining the updated image by optimizing, according to a first loss function, the image to be processed according to the iterative operation until a value of the first loss function satisfies a termination condition:

the second optimization operation includes:

determining, using an optimizing model, an optimized image based on the updated image; and designating the optimized image as a next image to be processed in a next iteration step or designating the optimized image as the reconstructed image.

18. The method of claim 3, wherein the first quality weight is determined based on at least one of interference information in originally acquired projection data associated with the initial image, parameters for acquiring the originally acquired projection data, or a signal-to-noise ratio of the originally acquired projection data.

19. The method of claim 1, wherein the iterative operation includes multiple iterations, and each iteration includes:

determining forward projection data by performing a forward projection transformation on the image to be processed in the iteration step;

determining a weighted error between the forward projection data and originally acquired projection data associated with the initial image based on at least one of a first quality weight, a second quality weight, or a third quality weight, the forward projection data, and the originally acquired projection data; and determining the updated image based at least in part on back projection data of the weighted error between the forward projection data and the originally acquired projection data associated with the initial image.

20. The method of claim 1, wherein the first loss function includes a fidelity term and one or more regularization terms, the fidelity term and the one or more regularization terms have a same input of the image to be processed.

\* \* \* \* \*